US010289327B2

(12) United States Patent
Zevulun et al.

(10) Patent No.: US 10,289,327 B2
(45) Date of Patent: May 14, 2019

(54) SCHEDULING SCHEME(S) FOR A MULTI-DIE STORAGE DEVICE

(71) Applicant: Western Digital Technologies, Inc., San Jose, CA (US)

(72) Inventors: Einat Inna Zevulun, Kfar Saba (IL); Yacov Duzly, Raanana (IL); Amir Shaharabany, Kochav Yair (IL); Igor Genshaft, Bat Yam (IL); Marina Frid, Jerusalem (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 511 days.

(21) Appl. No.: 14/749,498

(22) Filed: Jun. 24, 2015

(65) Prior Publication Data
US 2016/0357471 A1  Dec. 8, 2016

Related U.S. Application Data

(60) Provisional application No. 62/171,857, filed on Jun. 5, 2015.

(51) Int. Cl.
*G06F 3/00* (2006.01)
*G06F 3/06* (2006.01)
*G06F 12/02* (2006.01)

(52) U.S. Cl.
CPC ............ *G06F 3/0629* (2013.01); *G06F 3/061* (2013.01); *G06F 3/0604* (2013.01); *G06F 3/064* (2013.01); *G06F 3/0659* (2013.01); *G06F 3/0683* (2013.01); *G06F 3/0688* (2013.01); *G06F 12/0246* (2013.01); *G06F 2212/1024* (2013.01); *G06F 2212/7205* (2013.01); *G06F 2212/7206* (2013.01); *G06F 2212/7208* (2013.01)

(58) Field of Classification Search
CPC ...................... G06F 3/0659; G06F 2212/7208
USPC ........................................................ 711/169
See application file for complete search history.

(56) References Cited

U.S. PATENT DOCUMENTS

| 6,314,025 | B1 | 11/2001 | Wong |
| 6,788,575 | B2 | 9/2004 | Kozakai et al. |
| 7,280,398 | B1 | 10/2007 | Lee |
| 7,395,404 | B2 | 7/2008 | Gorobets et al. |
| 8,040,744 | B2 | 10/2011 | Gorobets et al. |

(Continued)

OTHER PUBLICATIONS

PCT Application No. PCT/US2016/035783, International Search Report and the Written Opinion of the International Searching Authority, dated Aug. 18, 2016, 11 pages.

(Continued)

*Primary Examiner* — Midys Rojas
(74) *Attorney, Agent, or Firm* — Patterson & Sheridan, LLP; Steven Versteeg

(57) ABSTRACT

A method that may be performed by a data storage device includes configuring the data storage device to use a first scheduling scheme and, in response to detecting a trigger event, configuring the data storage device to use a second scheduling scheme. One of the first scheduling scheme and the second scheduling scheme is used to schedule performance of memory operations having the same operation type at a plurality of dies of a memory of the data storage device. The other of the first scheduling scheme and the second scheduling scheme is used to schedule memory operations opportunistically.

10 Claims, 8 Drawing Sheets

(56) References Cited

U.S. PATENT DOCUMENTS

| | | |
|---|---|---|
| 8,364,883 B2 | 1/2013 | Bennet et al. |
| 8,364,918 B1 | 1/2013 | Smith |
| 8,386,700 B2 | 2/2013 | Olbrich et al. |
| 8,484,407 B2 * | 7/2013 | Haukness ............... G11C 16/32 711/103 |
| 8,495,402 B2 | 7/2013 | Byom et al. |
| 8,566,671 B1 | 10/2013 | Ye et al. |
| 8,634,240 B2 | 1/2014 | Gavens et al. |
| 8,725,935 B2 | 5/2014 | Huang et al. |
| 8,726,104 B2 | 5/2014 | Sharon |
| 8,797,965 B2 * | 8/2014 | Alriksson ............ H03G 3/3052 370/328 |
| 9,032,165 B1 * | 5/2015 | Brooker .............. G06F 12/0806 711/154 |
| 2005/0144516 A1 | 6/2005 | Gonzalez et al. |
| 2007/0033325 A1 | 2/2007 | Sinclair |
| 2009/0006720 A1 * | 1/2009 | Traister ............... G06F 12/0246 711/103 |
| 2012/0173792 A1 | 7/2012 | Lassa et al. |
| 2012/0173797 A1 | 7/2012 | Shen |
| 2012/0278530 A1 * | 11/2012 | Ebsen ................... G06F 3/0659 711/103 |
| 2013/0013852 A1 * | 1/2013 | Hou .................... G06F 12/0246 711/103 |
| 2013/0138912 A1 | 5/2013 | Bux et al. |
| 2013/0139021 A1 | 5/2013 | Hassan |
| 2013/0290600 A1 | 10/2013 | Tzafrir |
| 2014/0185376 A1 | 7/2014 | Sinclair et al. |
| 2015/0154108 A1 * | 6/2015 | Gorobets ............ G06F 12/0246 711/103 |
| 2016/0313914 A1 * | 10/2016 | Koets ..................... G06F 3/061 |

OTHER PUBLICATIONS

Notification of and Internatioanl Preliminary Reprot on Patentability of the International Search Authority for PCT/US2016/035783 dated Dec. 14, 2017 and Dec. 5, 2017.

* cited by examiner

SCHEDULING SCHEME(S) FOR A MULTI-DIE STORAGE DEVICE

CROSS-REFERENCE TO RELATED APPLICATIONS

The present application claims benefit of U.S. Provisional Application No. 62/171,857 filed Jun. 5, 2015, which is incorporated by reference herein in its entirety.

FIELD OF THE DISCLOSURE

The present disclosure is generally related to scheduling scheme(s) for a multi-die storage device.

BACKGROUND

Data storage devices may be configured to receive read commands and/or write commands from an access device to be performed at multiple dies of a memory (e.g., flash memory) of the data storage device. In addition to performing the read commands and/or the write commands received from the access device, the data storage device may perform management operations, such as logical to physical table read and/or write operations, garbage collection operations, erase operations, and/or validate operations (e.g., verify operations to confirm data written to the memory does not include errors), as illustrative, non-limiting examples. Scheduling of the commands (e.g., the read commands and/or the write commands) received from the access device, in combination with scheduling one or more management operations, may result in different memory dies having "idle" time periods and "busy" time periods. The idle time periods may reduce memory utilization, which may correspond to reduced performance (e.g., read performance and/or write performance) of the data storage device.

DETAILED DESCRIPTION

Particular implementations are described with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

Figure 1:
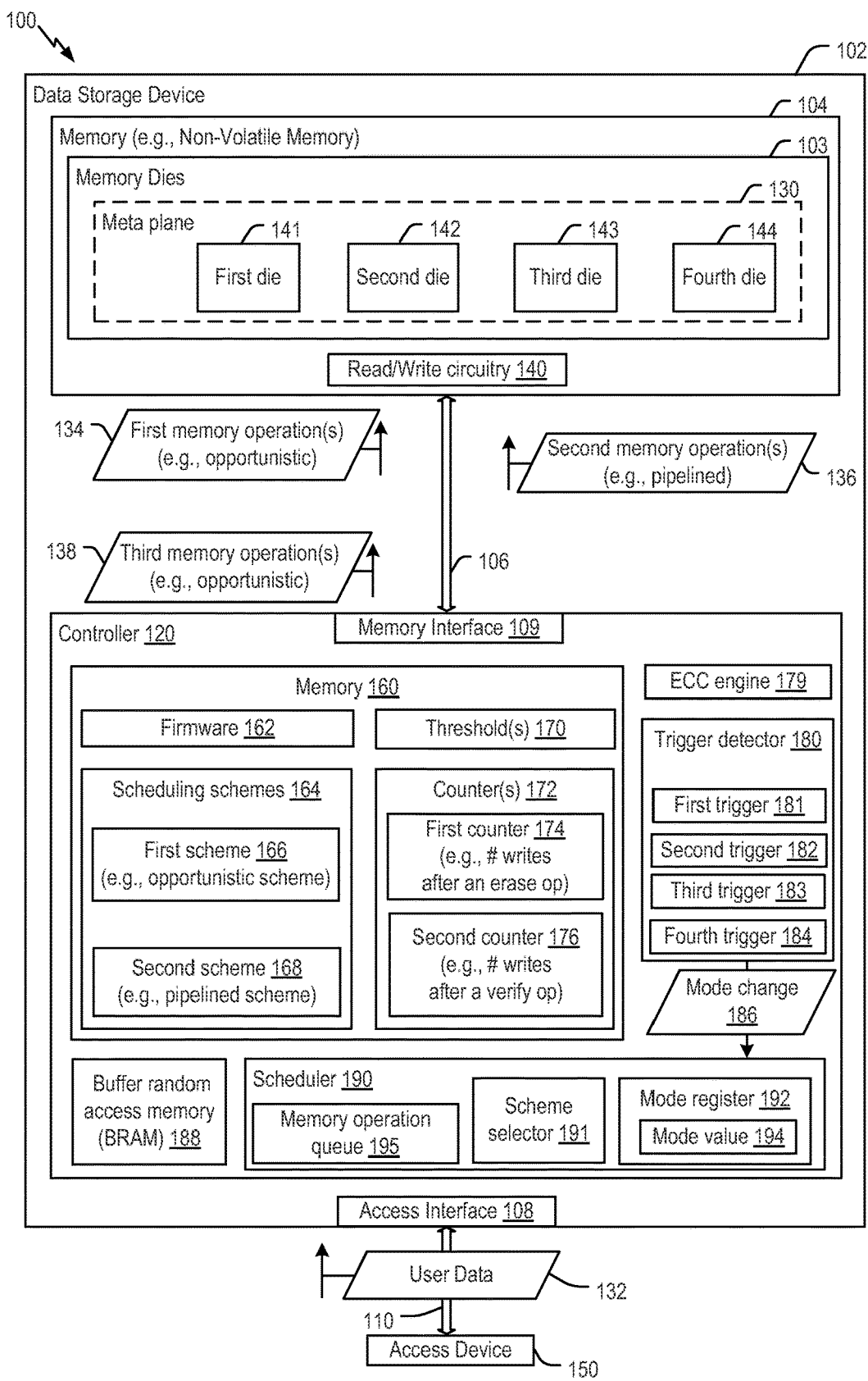
FIG. 1 is a block diagram of a particular illustrative embodiment of a system configured to schedule operations to be performed at a memory of a data storage device.

Referring to FIG. 1, a particular illustrative embodiment of a system is depicted and generally designated 100. The system 100 includes a data storage device 102 and an access device 150. The data storage device 102 includes a controller 120 and a memory 104, such as a non-volatile memory, that is coupled to the controller 120. The memory 104 includes multiple memory dies 103.

The controller 120 may be configured to schedule operations (e.g., memory operations) to be executed at the multiple memory dies 103. The operations may include operations (e.g., read operation and/or write operations) received from the access device 150 and management operations generated by the data storage device 102. For example, the management operations may include read management operations, write management operations, garbage collection operations, erase operations (e.g. block erase operations), and validate operations (e.g., verify operations), as illustrative, non-limiting examples.

The read management operations and the write management operations may be performed to use and/or maintain one or more tables and/or mappings, such as logical to physical mappings (e.g., a logical to physical mapping table), physical to logical mappings (e.g., a physical to logical mapping table), a free block list, etc., of the multiple memory dies 103. Due to the size of the one or more tables and/or mappings, the one or more tables and/or mappings may be stored in the memory 104. To use a particular table and/or mapping, the controller 120 may read a portion of the particular table and/or mapping from the memory 104 and may store the portion at a memory (e.g., a second memory 160, as described herein) of the controller 120, such as a random access memory (RAM) (e.g., a cache memory).

The garbage collection operations may be performed to create a free block. For example, the garbage collection operations may include read and write operations to move and consolidate data from one or more blocks into a single block. The erase operation may be configured to erase a block of data. An erase operation may be longer than a write operation. For example, the erase operation may take at least ten times longer to execute than a single-level cell (SLC) write operation, as an illustrative, non-limiting example. The validate operations may be configured to verify data written to the multiple memory dies 103 (e.g., to determine whether newly programmed data is error free). For example, the validate operation may include reading data previously written to a particular die of the multiple memory dies 103 and determining whether the read data includes errors.

The controller 120 may be configured to schedule one or more operations according to a first scheduling mode corresponding to a first scheduling scheme or according to a second scheduling mode corresponding to a second scheduling scheme. In some implementations, the first scheduling mode may be associated with an opportunistic scheduling scheme and the second scheduling mode may be associated with a pipelined schedule scheme (e.g., a fixed scheduling scheme). The opportunistic scheduling scheme may be configured to schedule one or more operations opportunistically. For example, the opportunistic scheduling scheme may be configured to be used to schedule different types of operations and/or operations having different durations based on "next available die" arbitration (e.g., a scheme in which operations are scheduled to multiple dies based on an order in which dies become available to receive and/or execute an operation) and/or based on priorities of multiple operations to be scheduled. The opportunistic scheduling scheme may be configured to treat each die of the multiple memory dies 103 in an independent manner and may schedule an operation at one die independent of operations scheduled (or being executed) at other dies of the multiple memory dies 103.

The pipelined scheduling scheme (e.g., the fixed scheduling scheme) may be configured to schedule sets of memory operations having a same operation type, such as an erase type, a validate type, a read type, a write type, etc., at the multiple memory dies 103. For example, the pipelined scheduling scheme may be configured to be used to schedule operations according to a predefined order (e.g., a fixed order). For example, the predefined order may indicate an order of scheduling different types of operations. To illustrate, a set of erase operations may be scheduled, followed by a set of verify operations. Additionally or alternatively, the pipelined scheduling scheme may be configured to be used to schedule the same type of operation to each die of the multiple memory dies 103 at the same time, e.g., execution of each of the operations at multiple dies of the multiple memory dies 103 may at least partially overlap in time.

In some implementations, the controller 120 may schedule sequential write operations to be performed at the multiple memory dies 103. For example, the controller 120 may detect that sequential write operations are to be performed based one or more write addresses corresponding to data to be written to the memory 104, based on a size of data to be written to the memory 104, or a combination thereof, as illustrative, non-limiting examples. If sequential writes are scheduled by the controller 120 and performed at the multiple memory dies 103, using a single scheduling mode (e.g., a single scheduling scheme) to schedule the sequential writes and management operations associated with performing the sequential write operations may result in idle periods for one or more dies of the multiple memory dies 103, which may reduce memory utilization of the memory 104.

For example, if the first scheduling mode (corresponding to the opportunistic scheme scheme) is used to schedule sequential writes, an erase operation may be performed on a particular die of the multiple memory dies 103 while write operations are performed on the other dies of the multiple memory dies 103. If the opportunistic scheduling scheme is configured to schedule operations to the multiple memory dies in a cyclic manner (e.g., a round robin approach), the other dies may experience idle periods while waiting for the erase operation to finish because the erase operation is longer than the write operations executed at the other dies. As another example, if the first scheduling mode (corresponding to the opportunistic scheme scheme) is used to schedule sequential writes, a validate operation may be performed at a particular die of the multiple memory dies 103 while write operations after a number of write operations performed at the particular die. The validate operation may include reading data from the particular die, which requires sending read commands to the particular die and storing read data at a storage location (e.g., a buffer) of the controller 120. Performing the read operation at the particular die and communicating the read data via a bus between the controller 120 and the memory 104 may cause idle periods for other dies that may be performing write operations (as part of the sequential writes).

As another example, if the second scheduling mode (corresponding to the pipelined scheme scheme) is used to schedule sequential write operations, the controller 120 may perform a management operation that causes the controller 120 to perform a read operation read data from the a particular die of the multiple memory dies 103. For example, the controller 120 may read (e.g., fetch) data that corresponds to a table and/or mapping, or to code to be executed by the controller 120, to perform the sequential write operations. Performing the read operation at the particular die and communicating the read data via a bus between the controller 120 and the memory 104 may cause idle periods for other dies that may be performing write operations (as part of the sequential writes).

The controller 120 may be configured to switch a scheduling mode (e.g., a selected scheduling scheme) between a first scheduling mode corresponding to a first scheduling scheme and second scheduling mode corresponding to a second scheduling scheme. In some implementations, the controller 120 may change the scheduling mode based on one or more trigger events. For example, the one or more trigger events may be based on a count of write operations, an erase operation, and/or a validate operation, as an illustrative, non-limiting examples. As another example, the one or more trigger events may be associated with writing data to a last page of a block of a die (of the multiple memory dies 103). In some implementations, a trigger event may correspond to a condition (e.g., a trigger condition) being satisfied, such as a number of write operations satisfying a threshold.

The selected scheduling mode (which corresponds to a selected scheduling scheme) may be used to schedule one or more operations to be performed at the memory 104. For example, scheduling and/or performing certain operations, such as erase operations and/or validate operations, in the first scheduling mode may result in one or more dies that are idle, which may reduce memory utilization of the data storage device 102. Using the second scheduling mode to schedule such operations may reduce occurrences and/or durations of idle periods, which may improve memory utilization of the data storage device 102. To illustrate, the controller 120 may switch from the first scheduling mode to the second scheduling mode based on determining that an erase operation is to be scheduled and may schedule the erase operation according to the second scheduling scheme, as described with reference to FIGS. 2A-2B. As another example, the controller 120 may switch from the first scheduling mode to the second scheduling mode based on determining that a validate operation (e.g., a verify operation) is to be scheduled and may schedule the validate operation according to the second scheduling scheme, as described with reference to FIG. 3. Additionally or alternatively, the controller 120 may switch from the second scheduling mode to the first scheduling mode based on detecting one or more trigger events, as described herein.

In response to detecting a trigger event, a particular scheduling scheme of multiple scheduling schemes may be selected (and applied). For example, if a trigger event is associated with a particular operation, such as a particular management operation, to be scheduled, the particular scheduling scheme may be selected based on the particular operation to be scheduled. After the particular operation is scheduled, a different scheduling scheme, such as a scheduling scheme applied prior to the particular scheduling scheme or a default scheduling scheme, may be selected.

Switching between the multiple scheduling schemes may enable scheduling execution of read/write operations received from the access device 150 with management operations (and/or other operations to enable the read/write operation received from the access device) to result in high memory utilization as compared to a data storage device that uses a single scheduling scheme.

The data storage device 102 and the access device 150 may be operationally coupled via a connection (e.g., a communication path 110), such as a bus or a wireless connection. For example, the data storage device 102 may include an access interface 108 that enables communication via the communication path 110 between the data storage device 102 and the access device 150, such as when the access interface 108 is communicatively coupled to the access device 150. In some implementations, the data storage device 102 may be embedded within the access device 150, such as in accordance with a Joint Electron Devices Engineering Council (JEDEC) Solid State Technology Association Universal Flash Storage (UFS) configuration. Alternatively, the data storage device 102 may be removable from the access device 150 (i.e., "removably" coupled to the access device 150). As an example, the data storage device 102 may be removably coupled to the access device 150 in accordance with a removable universal serial bus (USB) configuration. In some implementations, the data storage device 102 may include or correspond to a solid state drive (SSD) which may be included in, or distinct from (and accessible to), the access device 150. For example, the data storage device may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 102 may be coupled to the access device 150 indirectly, e.g., via a network. For example, the data storage device 102 may be a network-attached storage (NAS) device or a component (e.g., a solid-state drive (SSD) device) of a data center storage system, an enterprise storage system, or a storage area network.

In some implementations, the data storage device 102 may be configured to be coupled to the access device 150 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

In some implementations, the data storage device 102 and the access device 150 may be configured to communicate using one or more protocols, such as an eMMC protocol, a universal flash storage (UFS) protocol, a universal serial bus (USB) protocol, a serial advanced technology attachment (SATA) protocol, and/or another protocol, as illustrative, non-limiting examples. The one or more protocols may include a standardized protocol and/or a non-standardized protocol, such as a proprietary protocol. In some implementations, the data storage device 102 and the access device 150 may be configured to communicate using dual channel communication (e.g., both devices may issue and receive commands from the other device).

The access device 150 may include a memory interface (not shown) and may be configured to communicate with the data storage device 102 via the memory interface to read data from and write data to the memory 104 of the data storage device. For example, the access device 150 may operate in compliance with a Joint Electron Devices Engineering Council (JEDEC) industry specification, such as a Universal Flash Storage (UFS) Access Controller Interface specification. As other examples, the access device 150 may operate in compliance with one or more other specifications, such as a Secure Digital (SD) Access Controller specification, as an illustrative, non-limiting example. The access device 150 may communicate with the memory 104 in accordance with any other suitable communication protocol.

The access device 150 may include a processor and a memory. The memory may be configured to store data and/or instructions that may be executable by the processor. The memory may be a single memory or may include multiple memories, such as one or more non-volatile memories, one or more volatile memories, or a combination thereof. The access device 150 may issue one or more commands to the data storage device 102, such as one or more requests to erase data, read data from, or write data to the memory 104 of the data storage device 102. For example, the access device 150 may be configured to provide data, such as user data 132, to be stored at the memory 104 or to request data to be read from the memory 104. The access device 150 may include a mobile telephone, a music player, a video player, a gaming console, an electronic book reader, a personal digital assistant (PDA), a computer, such as a laptop computer or notebook computer, a network computer, a server, any other electronic device, or any combination thereof, as illustrative, non-limiting examples.

The memory 104 of the data storage device 102 may include a non-volatile memory. The memory 104 may have a two-dimensional (2D) memory configuration. Alternatively, the memory 104 may have another configuration, such as a three-dimensional (3D) memory configuration. For example, the memory 104 may include a three-dimensional (3D) memory configuration that is monolithically formed in one or more physical levels of arrays of memory cells having an active area disposed above a silicon substrate. In some implementations, the memory 104 may include circuitry associated with operation of the memory cells (e.g., storage elements).

The memory 104 includes multiple memory dies 103. For example, the multiple memory dies 103 may include a first die 141, a second die 142, a third die 143, and a fourth die 144. Although the multiple memory dies 103 are depicted as including four dies, in other implementations, the multiple memory dies 103 may include more than or fewer than four dies. In some implementations, each of the dies 141-144 may include one or more groups of storage elements. Each group of storage elements may include multiple storage elements (e.g., memory cells) and may be configured as a page or a word line.

A set of dies of the multiple memory dies 103 may be logically grouped as a meta plane 130. For example, the set of dies may include dies 141-144. A meta block may include a group of multiple blocks that are located in memory dies of the same meta plane that are processed together as if they were a single large block. Although the meta plane 130 is illustrated as having four dies, in other implementations a meta plane may include more than four dies or fewer than four dies. Additionally or alternatively, although the multiple memory dies 103 are illustrated as including one meta plane 130, in other implementations, the multiple memory dies may include multiple meta planes that are each associated with a corresponding set of dies.

The memory 104 may include support circuitry, such as read/write circuitry 140, to support operation of the multiple memory dies 103. Although depicted as a single component, the read/write circuitry 140 may be divided into separate components of the memory 104, such as read circuitry and write circuitry. The read/write circuitry 140 may be external to one or more dies of the multiple memory dies 103 of the memory 104. Alternatively, one or more individual memory dies of the multiple memory dies 103 may include corresponding read/write circuitry that is operable to read data from and/or write data to storage elements within the individual memory die independent of any other read and/or write operations at any of the other memory dies.

The controller 120 is coupled to the memory 104 via a bus 106, an interface (e.g., interface circuitry, such as a memory interface 109), another structure, or a combination thereof. For example, the bus 106 may include multiple distinct channels to enable the controller 120 to communicate with each of the multiple memory dies 103 in parallel with, and independently of, communication with the other memory dies of the multiple memory dies 103. In some implementations, the memory 104 may be a flash memory, as an illustrative, non-limiting example.

The controller 120 is configured to receive data and instructions from the access device 150 and to send data to the access device 150. For example, the controller 120 may send data to the access device 150 via the access interface 108, and the controller 120 may receive data from the access device 150 via the access interface 108. The controller 120 is configured to send data and commands to the memory 104 and to receive data from the memory 104. For example, the controller 120 is configured to send data and a write command to cause the memory 104 to store data to a specified address of the memory 104. The write command may specify a physical address of a portion of the memory 104 (e.g., a physical address of a word line of one of the dies 141-144 of the memory 104) that is to store the data. The controller 120 may also be configured to send data and commands to the memory 104 associated with background scanning operations, garbage collection operations, and/or wear leveling operations, etc., as illustrative, non-limiting examples. The controller 120 is configured to send a read command to the memory 104 to access data from a specified address of the memory 104. The read command may specify the physical address of a portion of the memory 104 (e.g., a physical address of a word line of one of the dies 141-144 of the memory 104).

The controller 120 may include a second memory 160, an error correction code (ECC) engine 179, a trigger detector 180, a buffer random-access memory (BRAM) 188, and a scheduler 190. The second memory 160 may include firmware 162, one or more thresholds 170, scheduling schemes 164, and one or more counters 172. The one or more thresholds 170 may include one or more thresholds used by the trigger detector 180 and/or the scheduler 190, as described further herein. The firmware 162 may include or correspond to executable instructions that may be executed by the controller 120, such as by a processor included in the controller 120. Responsive to the data storage device 102 being powered up, the firmware 162 may be accessed at the second memory 160 and/or stored in the second memory 160 (e.g., received from another memory, such as the memory 104, and stored in the second memory 160). For example, the firmware 162 may be stored in the other memory (e.g., the memory 104, a read-only memory (ROM) of the controller 120, a memory of the access device 150, or another memory) and may be loaded into the second memory 160 in response to a power-up of the data storage device 102.

The multiple scheduling schemes 164 may include a first scheduling scheme 166 and a second scheduling scheme 168. The first scheduling scheme 166 may include or correspond to an opportunistic scheduling scheme. The opportunistic scheduling scheme may be configured to be used to schedule different types of operations and/or operations having different durations based on "next available die" arbitration (e.g., a scheme in which operations are scheduled to multiple dies based on an order in which dies become available to receive and/or execute an operation) and/or based on priorities of multiple operations to be scheduled. The opportunistic scheduling scheme may be configured to treat each die of the multiple memory dies 103 in an independent manner and may schedule an operation at one die independent of operations scheduled (or being executed) at other dies of the multiple memory dies 103. A first example of an opportunistic scheduling scheme is a round robin approach in which operations are scheduled to the multiple memory dies 103 in a circular manner. To illustrate, a first operation may be scheduled to the first die 141, a second operation may be scheduled to the second die 142, a third operation may be scheduled to the third die 143, a fourth operation may be scheduled to the fourth die 144, a fifth operation may be scheduled to the first die 141, etc. A second example of an opportunistic scheduling scheme may use a time estimation approach in which operations are scheduled to a next die predicted to be idle. To illustrate, for each die, the controller 120 may estimate a duration to complete an operation being executed by the die. The controller 120 may schedule an operation to a particular die that is predicted to be idle before the other dies of the multiple memory dies 103 based on the estimated duration determined for the particular die (as compared to estimated durations of operations being performed at the other dies).

The second scheduling scheme 168 may include or correspond to a pipelined scheduling scheme (e.g., a fixed scheduling scheme). The pipelined scheduling scheme may be configured to be used to schedule operations according to a predefined order. For example, the predefined order may indicate an order of scheduling different types of operations. To illustrate, a set of erase operations may be scheduled, followed by a set of verify operations. Additionally or alternatively, the pipelined scheduling scheme may be configured to be used to schedule the same type of operation to each of the multiple memory dies 103 at the same time, e.g., execution of each of the operations at the multiple memory dies 103 may at least partially overlap in time. In some implementations, the pipelined scheduling scheme may use the round robin approach to schedule the same type of operation to each of the multiple memory dies 103.

In addition to storing the multiple scheduling schemes 164 (e.g., the first scheduling scheme 166 and the second scheduling scheme 168), the second memory 160 includes the one or more counters 172. The one or more counters 172 may be configured to maintain a count of write operations associated with a die, such as the first die 141, of the memory 104. In some implementations, each write operation counted by the one or more counters 172 may be associated with a page write operation. The one or more counters 172 may include a first counter 174 and a second counter 176. Each of the first counter 174 and the second counter 176 may be configured to count a number of write operations associated with the first die 141. For example, the write operations associated with the first die 141 may include or correspond to write operations scheduled, initiated, or executed at the first die 141. To illustrate, the first counter 174 may be configured to count write operations scheduled (or performed or executed) at the first die 141 after a first particular memory operation, such as an erase operation, is scheduled, initiated, or executed at the first die 141.

The second counter 176 may be configured to count write operations scheduled (or performed or executed) at the first die after a second particular memory operation, such as a validate operation, is scheduled, initiated, or executed at the first die 141. In some implementations, the one or more counters 172 may include at least one counter for each die of the multiple memory dies 103. For example, the one or more counters 172 may include a counter for each die (of the multiple memory dies 103) that is configured to operate as described with reference to the first counter 174. Additionally or alternatively, the one or more counters may include a second counter for each die (of the multiple memory dies) that is configured to operate as described with reference to the second counter 176.

The scheduler 190 may be configured to select a scheduling scheme of the multiple scheduling schemes 164 and to use the selected scheduling scheme to schedule one or more operations to be performed at the memory 104. The scheduler 190 may include a scheme selector 191, a mode register 192, and a memory operation queue 195. The mode register 192 may include (e.g., store) a mode value 194 that indicates a scheduling scheme to be used by the scheduler 190 to schedule the one or more operations to be performed at the memory 104. As an illustrative, non-limiting example, a first mode value (e.g., a zero value) may correspond to the first scheduling scheme 166 and a second mode value (e.g., a one value) may correspond to the second scheduling scheme 168. The scheme selector 191 may be configured to select one of the multiple scheduling schemes 164 based on the mode value 194. The memory operation queue 195 may include data that indicates one or more operations to be scheduled to be performed. The one or more operations may include one or more read/write operations received from the access device 150, one or more management operations, or a combination thereof.

Operations that may be scheduled by the scheduler 190 may include an erase operation, a compaction operation (e.g., a garbage collection operation), a validates operation (e.g., a verify operation, such as post-write read (RBAX) operation or an enhanced post-write read (EPWR) error-checking operation), a single-level cell (SLC) write operation, a multi-level cell (MLC) write operation (configured to write 2 bits per cell (BPC), 3 BPC, or more than 3 BPC), a folding operation, a SLC read operation, a MLC read operation, a background operation, a wear-leveling operation, a scrubbing operation, a refresh operation, a logical to physical page read/write operation, or another operation, as illustrative, non-limiting examples. Background operations may include or correspond to data scrambling operations, column replacement operations, operations to handle write aborts and/or program failures, bad block and/or spare block management operations, error detection code (EDC) operations, encryption operations, error recovery operations, and/or address mapping operations (e.g., mapping of logical to physical blocks), as illustrative, non-limiting examples. In some implementations, operations other than read/write operations received from the access device 150 may be classified as (e.g., referred to) as management operations.

During a write operation, data may be written to the memory 104. During a read operation, data may be read from the memory 104. During a folding operation, an internal transfer may occur at the memory 104 where data stored at SLC pages is read and stored at one or more MLC pages. During a wear-leveling operation and/or a garbage collection operation, data may be transferred within the memory 104 for purposes of equalizing wear of different regions of the memory 104 and/or for gathering defragmented data into one or more consolidated regions of the memory 104. During an erase operation, data may be erased from the memory 104. During a validate operation (e.g., a verify operation) data written to the memory 104 may be verified for accuracy. For example, data written to the memory 104 may be read and a decode operation and/or an error correction operation may be performed on the decoded data. During a BRAX operation or an EPWR error-checking operation, data written to the memory 104, such as SLC data and/or MLC data, may be verified for accuracy.

During a scrubbing operation, data may be read from the memory 104 and a corrective action may be performed to compensate for disturbs of storage levels, such as program disturbs, read disturbs, and/or erase disturbs. During a refresh operation, data storage levels at a portion of the memory may be maintained to compensate for voltage shifts and to correct incorrect data values. During a logical to physical page read/write operation, data may be read from or written to a data structure that stores logical to physical page information, such as a logical to physical table.

The controller 120 also includes the trigger detector 180. The trigger detector 180 may be configured to detect one or more trigger events. For example, the one or more trigger events may include a first trigger event 181, a second trigger event 182, a third trigger event 183, and a fourth trigger event 184. Although the one or more trigger events are described as including four trigger events, in other implementations, the one or more trigger events may include more than or fewer than four trigger events. Although the trigger detector 180 is illustrated as being separate from the scheduler 190, in other implementations, the trigger detector 180 may be included in the scheduler 190.

Each of the one or more trigger events may be associated with changing a selected scheduling scheme. In response to the trigger detector 180 detecting a trigger event, the trigger detector 180 may send mode change data 186 (e.g., a mode change signal) to the scheduler 190. The mode change data 186 may indicate a mode value 194 to be stored at the mode register 192.

The first trigger event 181 may be associated with scheduling an erase operation using the second scheduling scheme 168. For example, an erase operation may be scheduled to be executed at a particular die after a first number of write operations (e.g., page write operations) associated with the particular die. For example, an erase operation may be scheduled to be executed at the particular die after 128 write operations have been performed on the particular die following a most recently performed erase operation performed on the particular die, as an illustrative, non-limiting example. In some implementations, the first trigger event 181 may be associated with a first count of the first counter 174. The trigger detector 180 may detect the first trigger event 181 based on the first count of the first counter 174 satisfying a first threshold of the one or more thresholds 170.

For example, if the first counter 174 is incremented responsive to a write operation performed (e.g., scheduled, initiated, executed) at the first die 141, the first threshold may be satisfied if the first count is greater than or equal to the first threshold. If the first counter 174 is decremented responsive to a write operation performed (e.g., scheduled, initiated, executed) at the first die 141, the first threshold may be satisfied if the first count is less than or equal to the first threshold. In response to the first trigger event 181 being detected, the trigger detector 180 may generate the mode change data 186 to indicate the second scheduling scheme 168, which may cause the scheme selector 191 to select (or maintain) the second scheduling scheme 168. By selecting the second scheduling scheme 168, the second scheduling mode 168 may be used to schedule the erase operation (e.g., a set of erase operations) to be performed at the dies 141-144.

The second trigger event 182 may be associated with selecting (e.g., switching back to) the first scheduling scheme after an erase operation (e.g., a set of erase operations) is scheduled using the second scheduling scheme 168. For example, after the erase operation is scheduled, initiated for execution, or executed, the first scheduling scheme 166 may be used to schedule one or more operations. The trigger detector 180 may detect the second trigger event 182 in response to an erase operation being scheduled, initiated, or executed according to the second scheduling scheme 168. In response to the second trigger event 182 being detected, the trigger detector 180 may generate the mode change data 186 to indicate the first scheduling scheme 166. Additionally or alternatively, in response to detecting the second trigger event 182, the trigger detector 180 may be configured to cause the first counter 174 to be set to an initial value (e.g., a default value), such as a zero, as an illustrative, non-limiting example. By selecting the first scheduling scheme 166, the first scheduling scheme 166 may be used to schedule one or more operations in an opportunistic manner. Accordingly, detecting the first trigger 181 followed by detecting the second trigger 182 may enable the scheduler 190 to switch from the first scheduling scheme 166 to the second scheduling scheme 168 to schedule a set of erase operations, and to switch back to the first scheduling scheme 166 after the set of erase operations are scheduled. Using the second scheduling scheme 168 to schedule the set of erase operations, as opposed to using the first scheduling scheme 166, may improve memory utilization of the data storage device 102 by reducing idle periods that may occur if the first scheduling scheme 166 is used to schedule the set of erase operations.

The third trigger event 183 may be associated with scheduling a validate operation using the second scheduling scheme 168. For example, a validate operation may be scheduled to be executed at a particular die after a second number of write operations (e.g., page write operations) associated with the particular die. For example, a validate operation may be scheduled to be executed at the particular die after 20 write operations have been performed on the particular die following a most recently performed validate operation performed on the particular die, as an illustrative, non-limiting example. In some implementations, the third trigger event 183 may be associated with a second count of the second counter 176. The trigger detector 180 may detect the third trigger event 183 based on the second count of the second counter 176 satisfying a second threshold of the one or more thresholds 170. For example, if the second counter 176 is incremented responsive to a write operation performed (e.g., scheduled, initiated, executed) at the first die 141, the second threshold may be satisfied if the second count 176 is greater than or equal to the second threshold. If the second counter is decremented responsive to a write operation performed (e.g., scheduled, initiated, executed) at the first die 141, the second threshold may be satisfied if the second count is less than or equal to the second threshold. In response to the third trigger event 183 being detected, the trigger detector 180 may generate the mode change data 186 to indicate the second scheduling scheme 168, which may cause the scheme selector 191 to select (or maintain) the second scheduling scheme 168. By selecting the second scheduling mode 168, the second scheduling scheme 168 may be used to schedule the erase operation (e.g., a set of erase operations) to be performed at the dies 141-144.

The fourth trigger event 184 may be associated with selecting (e.g., switching back to) the first scheduling scheme after a validate operation (e.g., a set of validate operations) is scheduled using the second scheduling scheme 168. For example, after the validate operation (e.g., a verify operation) is scheduled, initiated for execution, or executed, the first scheduling scheme 166 may be used to schedule one or more operations. The trigger detector 180 may detect the fourth trigger event 184 in response to a validate operation being scheduled, initiated, or executed according to the second scheduling scheme 168. In response to the fourth trigger event 184 being detected, the trigger detector 180 may generate the mode change data 186 to indicate the first scheduling scheme 166. Additionally or alternatively, in response to detecting the fourth trigger event 184, the trigger detector 180 may be configured to cause the second counter 176 to be set to an initial value (e.g., a default value), such as a zero, as an illustrative, non-limiting example. By selecting the first scheduling scheme 166, the first scheduling scheme 166 may be used to schedule one or more operations in an opportunistic manner. Accordingly, detecting the third trigger 183 followed by detecting the fourth trigger 184 may enable the scheduler 190 to switch from the first scheduling scheme 166 to the second scheduling scheme 168 to schedule a set of validate operations, and to switch back to the first scheduling scheme 166 after the set of erase operations are scheduled. Using the second scheduling scheme 168 to schedule the set of validate operations, as opposed to using the first scheduling scheme 166, may improve memory utilization of the data storage device 102 by reducing idle periods that may occur if the first scheduling scheme 166 is used to schedule the set of validate operations.

The ECC engine 179 may be configured to receive data, such as the user data 132, and to generate one or more error correction code (ECC) codewords (e.g., including a data portion and a parity portion) based on the data. For example, the ECC engine 179 may receive the user data 132 and may generate a codeword. To illustrate, the ECC engine 179 may include an encoder configured to encode the data using an ECC encoding technique. The ECC engine 179 may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

The ECC engine 179 may include a decoder configured to decode data read from the memory 104 to detect and correct bit errors that may be present in the data. For example, the ECC engine 179 may correct a number of bit errors up to an error correction capability of an ECC technique used by the ECC engine 179. A number of errors identified by the ECC engine 179 may be tracked by the controller 120, such as by the ECC engine 179.

The buffer random-access memory (BRAM) 188 may be configured to buffer data passed between the access device 150 and the memory 104. For example, data received from the access device 150 may be stored at the BRAM 188 prior to being written to the memory 104. In some implementations, the data received from the access device 150 may be encoded prior to being stored at the BRAM 188. For example, the data may be encoded by the ECC engine 179. As another example, data read from the memory 104 may be stored at the BRAM 188 prior to being provided to the access device 150. In some implementations, the data read from the memory 104 may be decoded prior to being stored at the BRAM 188. For example, the data may be decoded by the ECC engine 179.

During operation, the data storage device 102 may be powered on (e.g., a power-up event may be initiated). Responsive to the power-up event, the firmware 162 may be loaded into and/or accessed from the second memory 160. As part of the power-up event or following completion of the power-up event, the controller 120 may be configured to set each of the one or more counters 172 to a corresponding initial value. Additionally or alternatively, as part of the power-up event or following completion of the power-up event, the controller 120 may be configured to select a default scheduling scheme from the multiple scheduling schemes 164. As described herein, the first scheduling scheme 166 may be the default scheduling scheme; however, in other implementations, the second scheduling scheme 168 may be the default scheduling scheme.

The controller 120 may schedule one or more first memory operations 134 according to the first scheduling scheme 166 and may send the one or more first memory operations 134 to the memory 104 for execution. If the one or more first memory operations 134 include one or more write operations corresponding to the first die 141, the one or more counters 172 may be updated. For example, updating a particular counter may include incrementing the particular counter or, alternatively, updating the particular counter may include decrementing the particular counter).

The controller 120 may detect the first trigger event 181 and may select the second scheduling scheme 168 responsive to detecting the first trigger event 181. For example, the scheduler 190 may change (e.g., switch) from using the first scheduling scheme 166 to using the second scheduling scheme 168 based on the first trigger event 181 being detected.

After selecting the second scheduling scheme 168, the controller 120 may schedule one or more second memory operations 136 according to the second scheduling scheme 168 and may send the one or more second memory operations 136 to the memory 104 for execution. If the one or more second memory operations 136 include one or more write operations corresponding to the first die 141, the one or more counters 172 may be updated to track a count of write operations performed at the first die 141.

The controller 120 may detect the second trigger event 182 (or the fourth trigger event 184) and may select the first scheduling scheme 166 responsive to detecting the second trigger event 182 (or the fourth trigger event 184). For example, the scheduler 190 may change (e.g., switch) from using the second scheduling scheme 168 to using the first scheduling scheme 166 based on the second trigger event 182 (or the fourth trigger event 184) being detected.

After switching from the second scheduling scheme 168 to the first scheduling scheme 166, the controller 120 may schedule one or more third memory operations 138 according to the first scheduling scheme 166 and may send the one or more third memory operations 138 to the memory 104 for execution. If the one or more third memory operations 138 include one or more write operations corresponding to the first die 141, the one or more counters 172 may be updated (e.g., incremented or decremented).

In some implementations, prior to switching between the first scheduling scheme 166 and the second scheduling scheme 168, the scheduler 190 may determine whether one or more operations are to be scheduled using a selected scheduling scheme, as described with reference to FIG. 5. For example, when the selected scheduling scheme is the first scheduling scheme 166, the scheduler 190 may determine to switch to the second scheduling scheme 168. Prior to switching to the second scheduling scheme 168, the scheduler 190 may identify whether the memory operation queue 195 indicates one or more first operations that may be scheduled according to the first scheduling scheme 166. If the memory operation queue 195 indicates one or more first operations, the scheduler 190 may schedule the one or more first operations according to the first scheduling scheme 166 prior to switching to the second scheduling scheme 168. By scheduling available operations to be scheduled according to the first scheduling scheme 166 prior to switching from the first scheduling scheme 166 to the second scheduling scheme 168, the available operations may be scheduled according to the first scheduling scheme 166 without having to wait for other operations that are to be scheduled using the second scheduling scheme 168.

In some implementations, the controller 120 may detect the third trigger event 183 and may select the second scheduling scheme 168 responsive to detecting the third trigger event 183. After selecting the second scheduling scheme 168, the controller 120 may schedule one or more second memory operations 136 according to the second scheduling scheme 168 and may send the one or more second memory operations 136 to the memory 104 for execution. The controller 120 may detect the fourth trigger event 184 and may select the first scheduling scheme 166 responsive to detecting the fourth trigger event 184.

As another example, when the selected scheduling scheme is the second scheduling scheme 168, the scheduler 190 may determine to switch to the first scheduling scheme 166. Prior to switching to the first scheduling scheme 166, the scheduler 190 may identify whether the memory operation queue 195 indicates one or more second operations that may be scheduled using the second scheduling scheme 168. If the memory operation queue 195 indicates that one or more second operations, the scheduler 190 may schedule the one or more second operations according to the second scheduling scheme 168 prior to switching to the first scheduling scheme 166. By scheduling available operations to be scheduled according to the second scheduling scheme 168 prior to switching from the second scheduling scheme 168 to the first scheduling scheme 166, the available operations may be scheduled according to the second scheduling scheme 168 without having to wait for other operations that are to be scheduled according to the first scheduling scheme 166.

In some implementations, the scheduler 190 may select the second scheduling scheme 168 and may apply the second scheduling scheme 168 to one or more operations to schedule one or more operations. For example, the scheduler 190 may use the second scheduling scheme 168 to schedule a write operation (e.g., a long write command) received from the access device 150. In some implementations, scheduler 190 may schedule multiple write operations (e.g., multiple page write operations) to satisfy the long write command received from the access device 150. During scheduling and/or execution of the long write operation (e.g., the multiple write operations, the trigger detector 180 may detect a trigger event. For example, the trigger event may include or correspond to detect that a read operation (e.g., a short read operation) is to be scheduled. The read operation may be associated with populating a cache memory (not shown) by a fetching code stored at the memory 104. In response to detecting the trigger event, the trigger detector 180 may generate the mode change data 186 to cause the scheme selector 191 to select the first scheduling scheme 166. The scheme selector 191 may change from the second scheduling scheme 168 to the first scheduling scheme 166 and the scheduler 190 may schedule the read operation according to the first scheduling scheme 166. The trigger detector 180 may detect another trigger event corresponding to the read operation being scheduled, initiated for execution, or executed. In response to the other trigger event, the scheme selector 191 may switch from the first scheduling scheme 166 to the second scheduling scheme 168. In some implementations, the second scheduling scheme 168 may be a default scheduling scheme of the data storage device 102.

In some implementations, the scheduler 190 (e.g., the scheme selector 191) may be configured (e.g., enabled) to switch between the first scheduling scheme 166 and the second scheduling scheme 168 in response to detecting sequential write operations to be performed and/or being performed at the memory 104. For example, the scheduler 190 may detect the sequential write operations based one or more write addresses corresponding to data to be written to the memory 104, based on a size of data to be written to the memory 104, or a combination thereof, as illustrative, non-limiting examples. In some implementations, in response to detecting the sequential write operations, the scheme selector 191 may be enabled to switch between the first scheduling scheme 166 and the second scheduling scheme 168 based on the mode value 194 (e.g., based on the mode change data 186). In some implementations, if the sequential write operations are not detected, the scheme selector 191 may be unable to switch between the first scheduling scheme 166 and the second scheduling scheme 168, regardless of the mode value 194 (e.g., the mode change data 186). In such situations, the scheduler 190 may use (e.g., continue using) a selected scheduling scheme, such as a default scheduling scheme.

In some implementations, the one or more counters 172 may include a particular counter corresponding to the first die 141. The particular counter may be configured to count write operations (e.g., page write operations) performed at the first die 141. In response to an erase operation performed at the first die 141, a first value of the particular counter may be stored at the second memory 160. A count of write operations that are schedule, initiated for execution, or executed after the erase operation may be determined based on the count (e.g., a current count) indicated by the particular counter and the first value. The trigger detector 180 may compare the count of write operations that are schedule, initiated for execution, or executed after the erase operation to the first threshold. Additionally or alternatively, in response to a validate operation performed at the first die 141, a second value of the particular counter may be stored at the second memory 160. A count of write operations that are schedule, initiated for execution, or executed after the validate operation may be determined based on the count (e.g., a current count) indicated by the particular counter and the second value. The trigger detector 180 may compare the count of write operations that are schedule, initiated for execution, or executed after the validate operation to the second threshold.

In some implementations, the scheduling schemes 164 may include more than two scheduling schemes, such as the first scheduling scheme 166, a second scheduling scheme 168, and a third scheduling scheme. The third scheduling scheme may correspond to an opportunistic scheduling scheme or to a pipelined scheduling scheme. For example, if the third scheduling scheme and the first scheduling scheme 166 are opportunistic scheduling schemes, the third scheduling scheme may use a round robin approach and the first scheduling scheme 166 may use a time estimation approach. As another example, if the third scheduling scheme and the second scheduling scheme 168 are opportunistic scheduling schemes, the third scheduling scheme may be associated with a first order of scheduling different types of operations (e.g., schedule write type operations followed by erase type operations followed by validate type operations) and the second scheduling scheme 166 may be associated with a second order of scheduling different types of operations (e.g., schedule write type operations followed by validate type operations followed by erase type operations). If the scheduling schemes 164 include more than two scheduling schemes, the trigger detector 180 may include trigger events for each of the multiple scheduling schemes 164. For example, a first particular trigger may be associated with selecting the first scheduling scheme 166, a second particular trigger event may be associated with selecting the second scheduling scheme 168, and a third particular trigger may be associated with selecting the third scheduling scheme. Although the first scheduling scheme 166 has been described as the opportunistic scheduling scheme and the second scheduling scheme 168 has been described as the pipelined scheduling scheme, in other implementations, the first scheduling scheme 166 may be the pipelined scheduling scheme and the second scheduling scheme 168 may be the opportunistic scheduling scheme.

In some implementations, the data storage device 102 may include logical to physical mapping data, such as a logical to physical mapping table. For example, the logical to physical mapping data may be stored at the memory 104 and/or the second memory 160 of the data storage device 102. Additionally or alternatively, the logical to physical mapping data may be stored at a memory of the access device 150.

Although the memory operation queue 195 is depicted as being included in the scheduler 190, in other implementations, the memory operation queue 195 may be included in the access interface 108, the memory 104, the second memory 160, or the access device 150, as illustrative, non-limiting examples. For example, each of the data storage device 102 and the access device 150 may include a corresponding memory operation queue. The memory operation queue maintained by the access device 150 may enable the access device 150 track memory operations sent from the access device 150 to the data storage device.

In some implementations, the firmware 162, the one or more thresholds 170, the multiple scheduling schemes 164, the one or more counters 172, or a combination thereof, may be stored at the memory 104. In other implementations, the controller 120 may include or may be coupled to a particular memory (e.g., the second memory 160), such as a random access memory (RAM), that is configured to store, the firmware 162, the one or more thresholds 170, the multiple scheduling schemes 164, the one or more counters 172, or a combination thereof. Alternatively, or in addition, the controller 120 may include or may be coupled to another memory (not shown), such as a non-volatile memory, a RAM, or a read only memory (ROM). The other memory may be a single memory component, multiple distinct memory components, and/or may indicate multiple different types (e.g., volatile memory and/or non-volatile) of memory components. In some embodiments, the other memory may be included in the access device 150.

Although one or more components of the data storage device 102 have been described with respect to the controller 120, in other implementations certain components may be included in the memory 104. For example, one or more of the second memory 160, the ECC engine 179, the trigger detector 180, the BRAM 188, and/or the scheduler 190 may be included in the memory 104. Alternatively, or in addition, one or more functions as described above with reference to the controller 120 may be performed at or by the memory 104. For example, one or more functions of the second memory 160, the ECC engine 179, the trigger detector 180, the BRAM 188, and/or the scheduler 190 may be performed by components and/or circuitry included in the memory 104. Alternatively, or in addition, one or more components of the data storage device 102 may be included in the access device 150. For example, one or more of the second memory 160, the ECC engine 179, the trigger detector 180, the BRAM 188, and/or the scheduler 190 may be included in the access device 150. Alternatively, or in addition, one or more functions as described above with reference to the controller 120 may be performed at or by the access device 150. As an illustrative, non-limiting example, the access device 150 may be configured to detect one or more trigger events and to send the mode change data 186 to the scheduler 190 of the data storage device 102 in response to detecting the one or more trigger events.

By detecting one or more trigger events (e.g., one or more trigger conditions), the data storage device 102 may dynamically switch between the first scheduling scheme 166 and the second scheduling scheme 168. For example, the data storage device 102 may dynamically switch between the first scheduling scheme 166 and the second scheduling scheme 168 during performance (e.g., scheduling, initiating, and/or executing) sequential write operations. By dynamically switching the selected scheduling mode, the second scheduling scheme 168 (and/or the first scheduling scheme 166) may be selectively used (e.g., applied) to improve memory utilization (of the memory 104) as compared to a storage device that utilizes a single selection scheme.

Figure 2A:
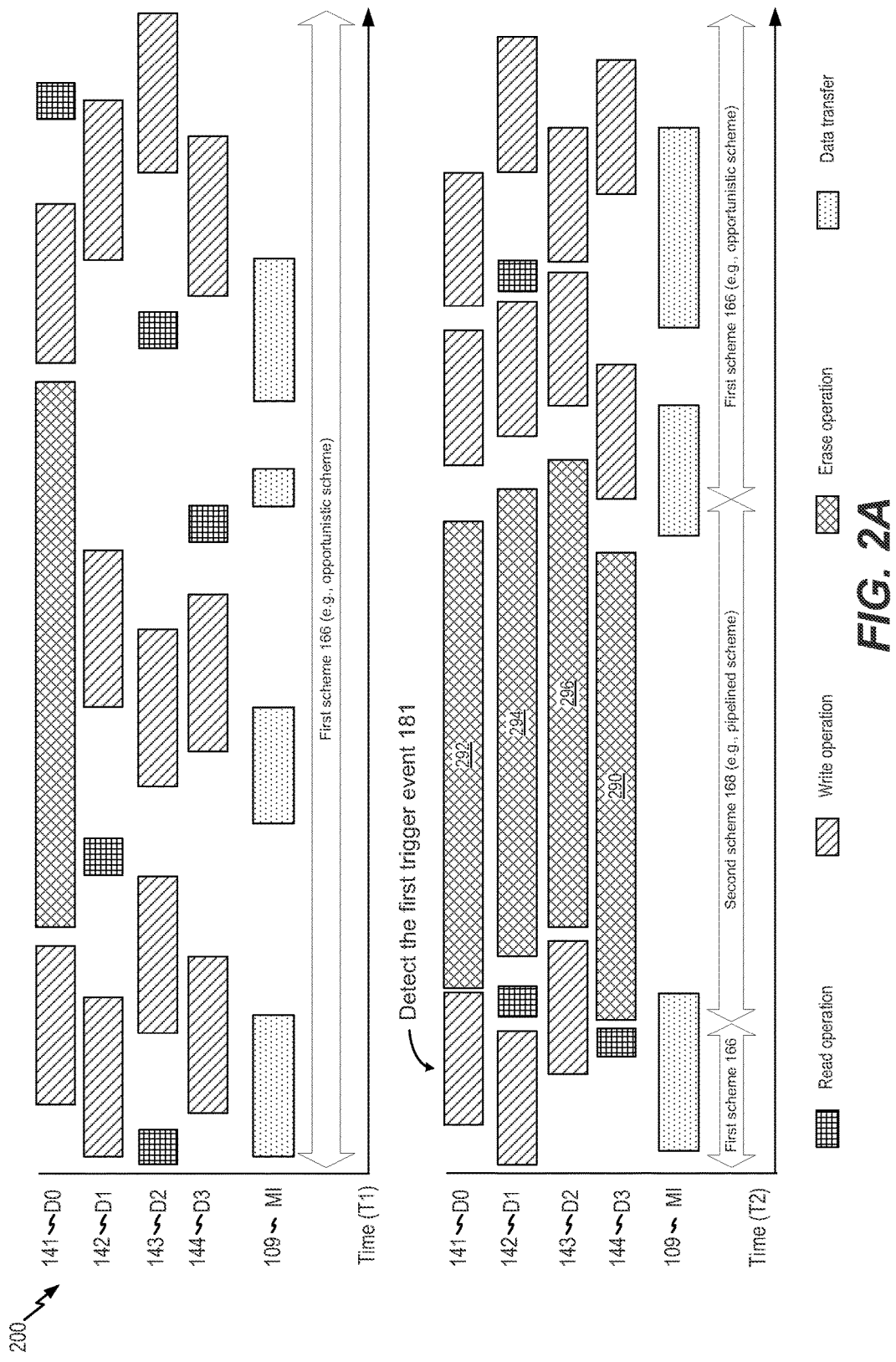
FIGS. 2A-2B are timing diagrams that illustrate examples of operations that may be performed at the data storage device of FIG. 1.

Referring to FIG. 2A, a particular illustrative embodiment of a first timing diagram of operations performed at the system 100 is depicted and generally designated 200. For example, the first timing diagram 200 illustrates data transferred from the controller 120 to the memory 104 via the memory interface (MI) 109 and operations performed at the memory dies 141-144. The timing diagram 200 includes a first portion corresponding to a first time period (T1) and a second portion corresponding to a second time period (T2). The first time period (T1) may occur prior to the second time period (T2).

During the first time period (T1), the scheduler 190 may schedule one or more first operations according to the first scheduling scheme 166, such as an opportunistic scheduling scheme. The one or more first operations may include or correspond to the one or more first memory operations 134 of FIG. 1. As illustrated in the first timing diagram 200, the dies 141-144 may execute the one or more first operations scheduled according to the first scheduling scheme 166.

During the second time period (T2), the scheduler 190 may schedule one or more second operations. The one or more second operations may include or correspond to the one or more first memory operations 134 of FIG. 1. As illustrated in the first timing diagram 200, the dies 141-144 may execute the one or more second operations scheduled according to the first scheduling scheme 166. The trigger detector 180 may detect the first trigger event 181 during the second time period (T2). For example, a counter corresponding to the third die (D2) 143 may be incremented in response to a write operation scheduled to be executed at the third die (D2) 143.

In response to detection of the first trigger event 181, the scheme selector 191 may select the second scheduling scheme 168, such as a pipelined scheduling scheme. The scheduler 190 may schedule a set of erase operations to be performed at the dies 141-144. For example, a first erase operation 290 may be scheduled to be executed at the fourth die (D3) 144 a second erase operation 292 may be scheduled to be executed at the first die (D0) 141, a third erase operation 294 may be scheduled to be executed at the second die (D1) 142, and a fourth erase operation 296 may be scheduled to be executed at the third die (D2) 143. The set of erase operations may include or correspond to the one or more second memory operations 136 of FIG. 1. As illustrated in first timing diagram 200, prior to scheduling the set of erase operations according to the second scheduling scheme 168, a first read operation may be scheduled at the fourth die (D3) 144 and a second read operation may be scheduled at the second die (D1) 142 according to the first scheduling scheme 166.

The trigger detector 180 may detect the second trigger event 182 associated with the set of erase operations. For example, the second trigger event 182 may correspond to the set of erase operations being scheduled, initiated for execution, or completed. To illustrate, the second trigger event 182 may correspond to the fourth erase operation 296 being scheduled, the first erase operation 290 being initiated, the fourth erase operation 296 being initiated, execution of the first erase operation 290 being completed, or execution of the fourth erase operation 296 being completed, as illustrative, non-limiting examples.

In response to detection of the second trigger event 182, the scheme selector 193 may select the first scheduling scheme 166 and the scheduler 190 may schedule one or more third operations. The one or more third operations may include or correspond to the one or more third memory operations 138 of FIG. 1. As illustrated in the first timing diagram 200, the dies 141-144 may execute the one or more third operations scheduled according to the first scheduling scheme 166 after the set of erase operations (scheduled according to the second scheduling scheme 168).

Figure 2B:
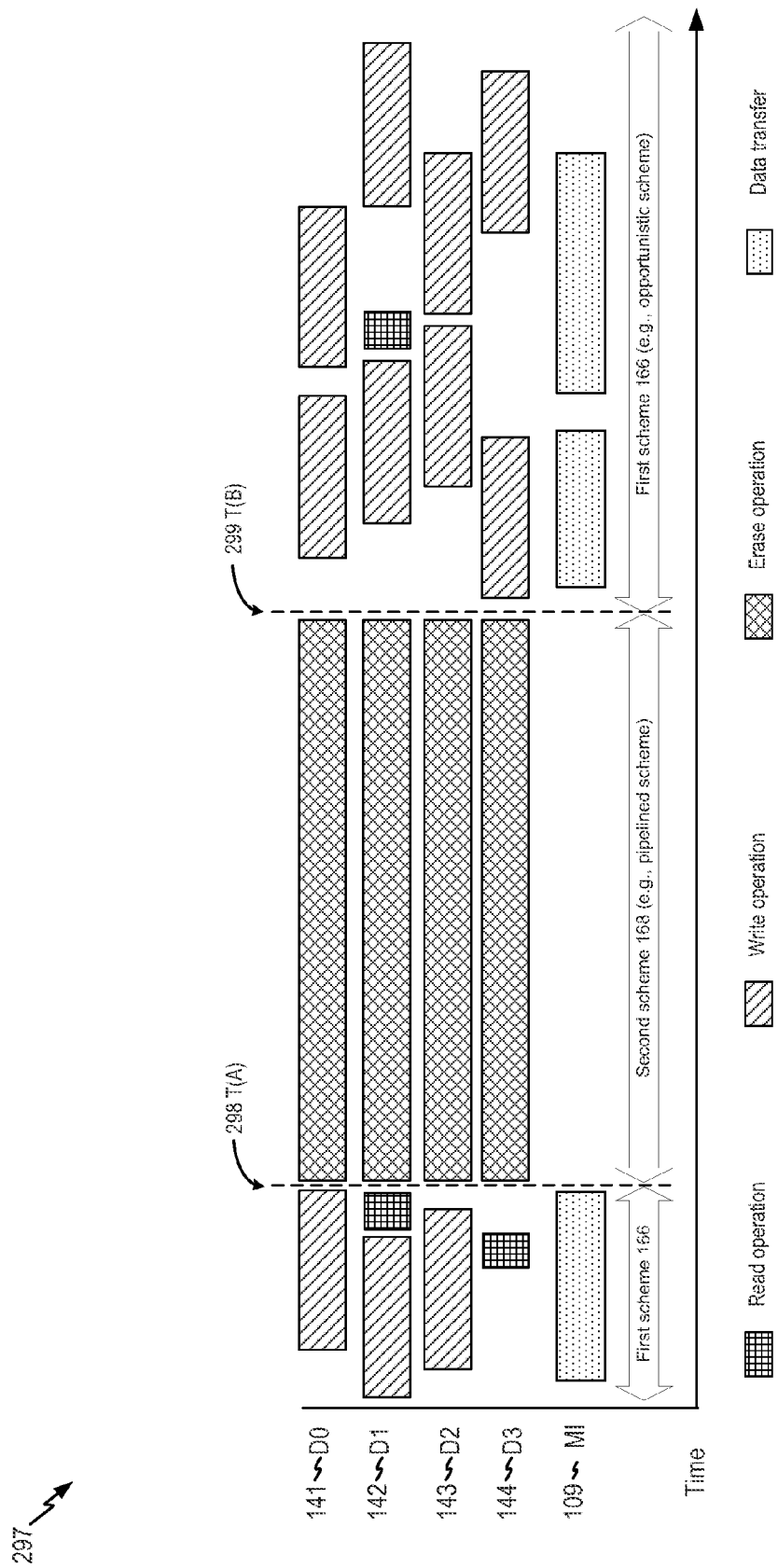

Referring to FIG. 2B, a particular illustrative embodiment of a second timing diagram of operations performed at the system 100 is depicted and generally designated 297. For example, the second timing diagram 297 illustrates data transferred from the controller 120 to the memory 104 via the memory interface (MI) 109 and operations performed at the memory dies 141-144.

The second timing diagram 297 depicts an alternate implementation as compared to the first timing diagram 200 of FIG. 2A. In the first timing diagram 200 of FIG. 2A, when switching between the first scheduling scheme 166 and the second scheduling scheme 168, one or more of the dies 141-144 perform operations according to the first scheduling scheme 166 while other dies are concurrently performing operations according to the second scheduling scheme 168. Accordingly, the first timing diagram 200 illustrates allowing at least one die to perform an operation according to the first scheduling scheme 166 while another die performs an operation according to the second scheduling scheme 168.

In the second timing diagram 297 of FIG. 2B, each of the dies 141-144 are illustrated as switching between the first scheduling scheme 166 and the second scheduling scheme 168 simultaneously. For example, at a first time T(A) 298, the dies 141-144 have completed operations according to the first scheduling scheme 166. After the first time T(A) 298, each of the dies 141-144 performs an operation(s) according to the second scheduling scheme 168. At a second time T(B) 299, the dies 141-144 have completed operations according to the second scheduling scheme 168. After the second time T(B) 299, each of the dies 141-144 performs operations according to the first scheduling scheme 166. Accordingly, the second timing diagram 297 illustrates simultaneously switching all of the dies 141-144 between the first scheduling scheme 166 and the second scheduling scheme 168.

Figure 3:
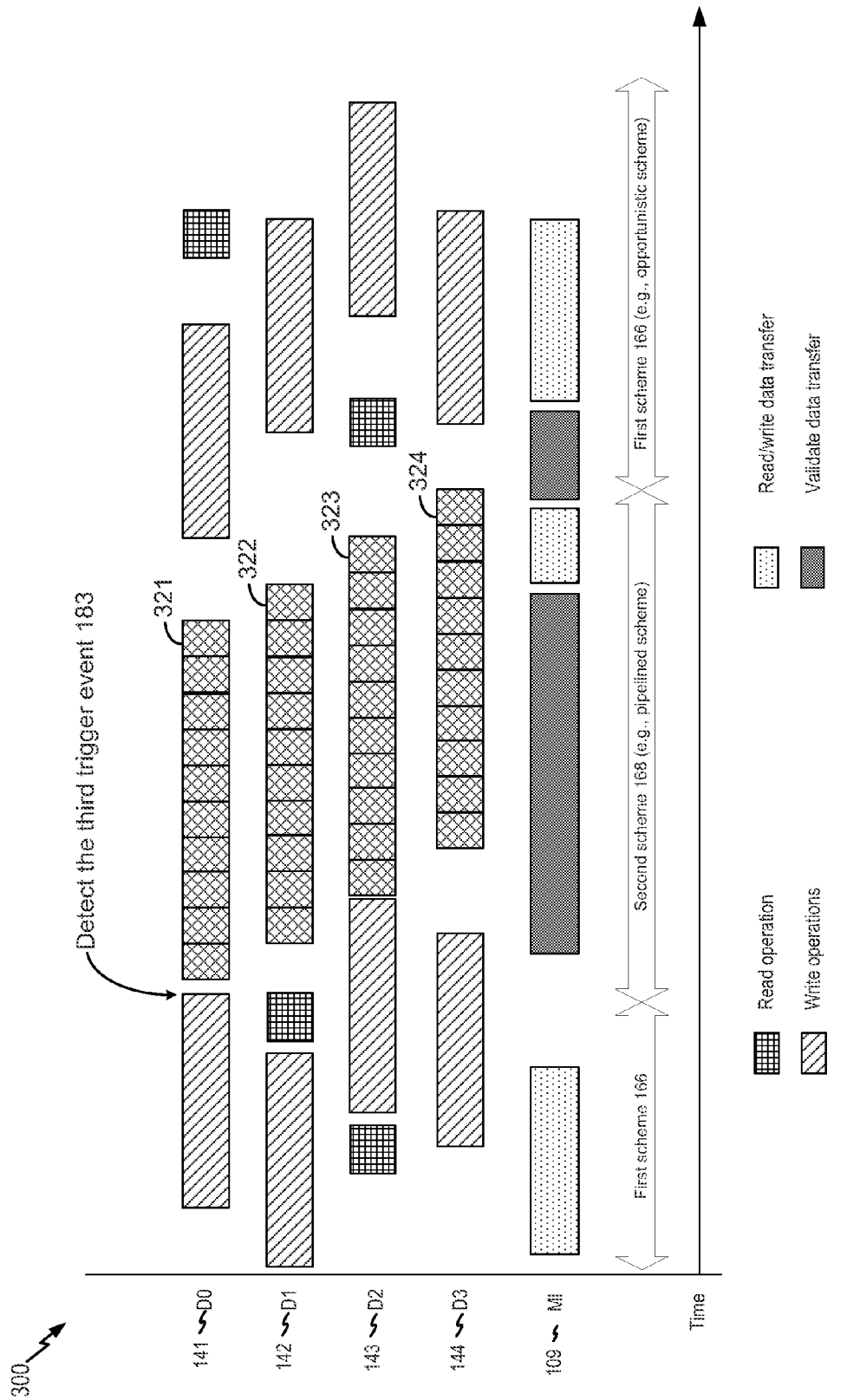
FIG. 3 is another timing diagram that illustrates examples of operations that may be performed at the data storage device of FIG. 1.

Referring to FIG. 3, a particular illustrative embodiment of a third timing diagram of operations performed at the system 100 is depicted and generally designated 300. For example, the third timing diagram 300 illustrates data transferred from the controller 120 to the memory 104 via the memory interface (MI) 109 and operations performed at the memory dies 141-144.

The scheduler 190 may schedule one or more first operations according to the first scheduling scheme 166, such as an opportunistic scheduling scheme. The one or more first operations may include or correspond to the one or more first memory operations 134 of FIG. 1. As illustrated in the third timing diagram 300, the dies 141-144 may execute the one or more first operations scheduled according to the first scheduling scheme 166.

The trigger detector 180 may detect the third trigger event 183 based on execution of the one or more first operations. For example, the second counter 176 may be incremented in response to completion of a write operation executed at the first die 141. The trigger detector 180 may compare the count of the second counter 176 to the second threshold and may detect the third trigger event 183 in response to the count satisfying the second threshold.

In response to detection of the third trigger event 183, the scheme selector 191 may select the second scheduling scheme 168, such as a pipelined scheduling scheme. The scheduler 190 may schedule a set of validate operations to be performed at the dies 141-144. The set of validate operations may include multiple validate operations to be performed at each of the dies 141-144. For example, a first group of multiple validate operations including a first validate operation 321 may be scheduled to be performed at the first die (D0) 141, a second group of multiple validate operations including a second validate operation 322 may be scheduled to be performed at the second die (D1) 142, a third group of multiple validate operations including a third validate operation 323 may be scheduled to be performed at the third die (D2) 143, and a fourth group of multiple validate operations including a fourth validate operation 324 may be scheduled to be performed at the fourth die (D3) 144. Although each group of multiple validate operations is depicted as including ten validate operations, in other implementations, each group of multiple validate operations may include more than or fewer than ten validate operations. The set of validate operations may include or correspond to the one or more second memory operations 136 of FIG. 1.

The trigger detector 180 may detect the fourth trigger event 184 associated with the set of validate operations. For example, the fourth trigger event 184 may correspond to the set of validate operations being scheduled, initiated for execution, or completed. To illustrate, the fourth trigger event 184 may correspond to the fourth validate operation 324 being scheduled, the first validate operation 321 being initiated, the fourth validate operation 324 being initiated, execution of the first validate operation 321 being completed, or execution of the fourth validate operation 324 being completed, as illustrative, non-limiting examples.

In response to detection of the fourth trigger event 184, the scheme selector 193 may select the first scheduling scheme 166 and the scheduler 190 may schedule one or more third operations. The one or more third operations may include or correspond to the one or more third memory operations 138 of FIG. 1. As illustrated in the third timing diagram 300, the dies 141-144 may execute the one or more third operations scheduled according to the first scheduling scheme 166 after the set of validate operations (scheduled according to the second scheduling scheme 168).

Thus, the timing diagrams 200, 297, and 300 each illustrate switching between the first scheduling scheme 166 and the second scheduling scheme 168. By switching between the first scheduling scheme 166 and the second scheduling scheme 168, memory utilization (of the memory 104) may be improved.

Figure 4:
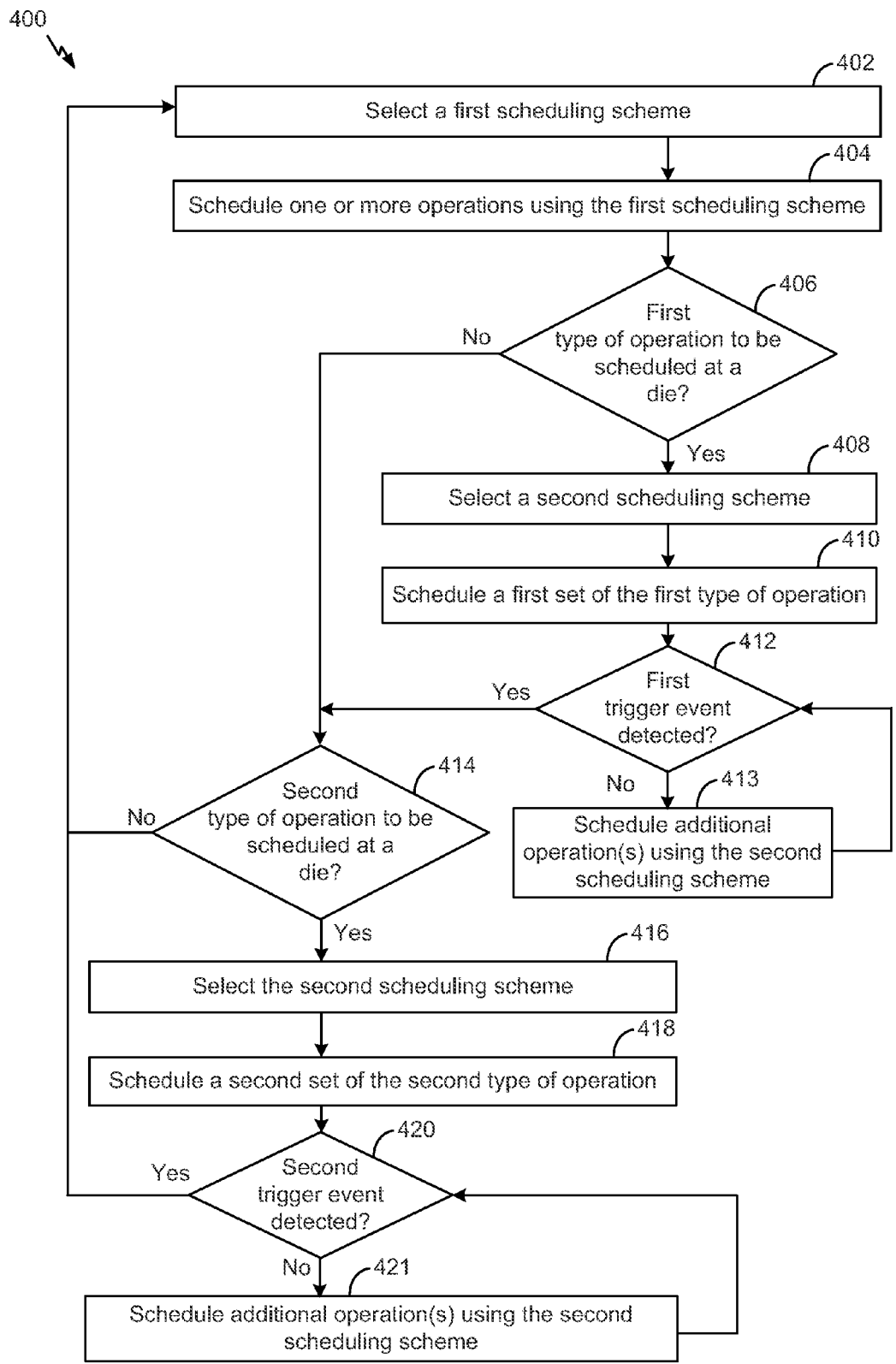
FIG. 4 is a flow diagram that illustrates a particular example of a method of operation of the data storage device of FIG. 1.

Referring to FIG. 4, a particular illustrative embodiment of a method is depicted and generally designated 400. The method 400 may be performed at the data storage device 102, such as by the scheduler 190, the controller 120, a processor or circuitry configured to execute the firmware 162 of FIG. 1, the access device 150, or a combination thereof, as illustrative, non-limiting examples.

The method 400 may include selecting a first scheduling scheme, at 402. The first scheduling scheme may include the first scheduling scheme 166 or the second scheduling scheme 168 of FIG. 1. In some implementations, the first scheduling scheme may be a default scheduling scheme of the data storage device. For example, the first scheduling scheme may be selected as the default scheduling scheme in response to a power-up of the data storage device.

The method 400 may include scheduling one or more operations according to (e.g., using) the first scheduling scheme, at 404. For example, the one or more operations may include or correspond to the one or more first memory operations 134 of FIG. 1.

The method 400 may include determining whether a first type of operation is to be scheduled at a die, at 406. For example, the die may include any of multiple dies of the data storage device, such as the dies 141-144 of FIG. 1. In some implementations, the first type of operation may include or correspond to an erase operation. If the first type of operation is not to be scheduled at a die, the method 400 may proceed to 414. Alternatively, if the first type of operation is to be scheduled at a die, the method 400 may proceed to 408.

The method 400 may include selecting a second scheduling scheme, at 408. The second scheduling scheme may be different than the first scheduling scheme. For example, if the first scheduling scheme is an opportunistic scheduling scheme, the second scheduling scheme may be a fixed scheduling scheme (e.g., a pipelined scheduling scheme). As another example, if the first scheduling scheme is the fixed scheduling scheme (e.g., the pipelined scheduling scheme), the second scheduling scheme may be the opportunistic scheduling scheme. In some implementations, if the first type of operation is the erase operation, the second scheduling scheme may include or correspond to the second scheduling scheme 168 (e.g., the pipelined scheduling scheme) of FIG. 1.

The method 400 may include scheduling a first set of the first type of operation, at 410. The first set of the first type of operation may include one operation for each die of the multiple dies of the data storage device. Alternatively, the first set of the first type of operation may include a number of operations that is less than a number of dies included in the data storage device. For example, the first set of the first type of operation may include an operation for each die of a first meta plane of multiple meta planes of the data storage device. In some implementations, the first set of the first type of operation may include or correspond to the one or more second memory operations 136 of FIG. 1.

The method 400 may include determining whether a first trigger event (e.g., a first trigger condition) is detected, at 412. For example, the first trigger event may include or correspond to one of the trigger events 181-184 of FIG. 1, such as the second trigger event 182 of FIG. 1. If the first trigger event is not detected, the method 400 may include scheduling one or more additional operations using the second scheduling scheme, at 413, and then proceed to 412. If the first trigger event is detected, the method 400 may proceed to 414.

The method 400 may include determining whether a second type of operation is to be scheduled at a die, at 414. In some implementations, the second type of operation may include or correspond to a validate operation. If the second type of operation is not to be scheduled at a die, the method 400 may proceed to 402 and the first scheduling scheme may be selected. Alternatively, if the second type of operation is to be scheduled, the method 400 may proceed to 416.

The method 400 may include selecting the second scheduling scheme, at 416. If the second scheduling scheme is a previous (e.g., most recently selected) scheduling scheme, selecting the second scheduling scheme may include maintaining the second scheduling scheme as a selected scheduling scheme.

The method 400 may include scheduling a second set of the second type operation, at 418. The second set of the second type of operation may include one operation for each die of the multiple dies of the data storage device. Alternatively, the second set of the second type of operation may include a number of operations that is less than a number of dies included in the data storage device. For example, the second set of the second type of operation may include an operation for each die of a first meta plane of multiple meta planes of the data storage device. In some implementations, the second set of the second type of operation may include or correspond to the one or more second memory operations 136 of FIG. 1.

The method 400 may include determining whether a second trigger event (e.g., a second trigger condition) is detected, at 420. For example, the second trigger event may include or correspond to one of the trigger events 181-184 of FIG. 1, such as the fourth trigger event 184 of FIG. 1. In some implementations, the second trigger event may be different than the first trigger event. If the second trigger event is not detected, the method 400 may include scheduling one or more additional operations using the second scheduling scheme, at 421, and then proceed to 420. If the second trigger event is detected, the method 400 may proceed to 402.

By selectively using the second scheduling scheme to schedule one or more operations (e.g., operations having the first type and/or second type), memory utilization of the data storage device may be improved. For example, the data storage device may dynamically switch between a first scheduling scheme and a second scheduling scheme to schedule to efficiently schedule operations.

Figure 5:
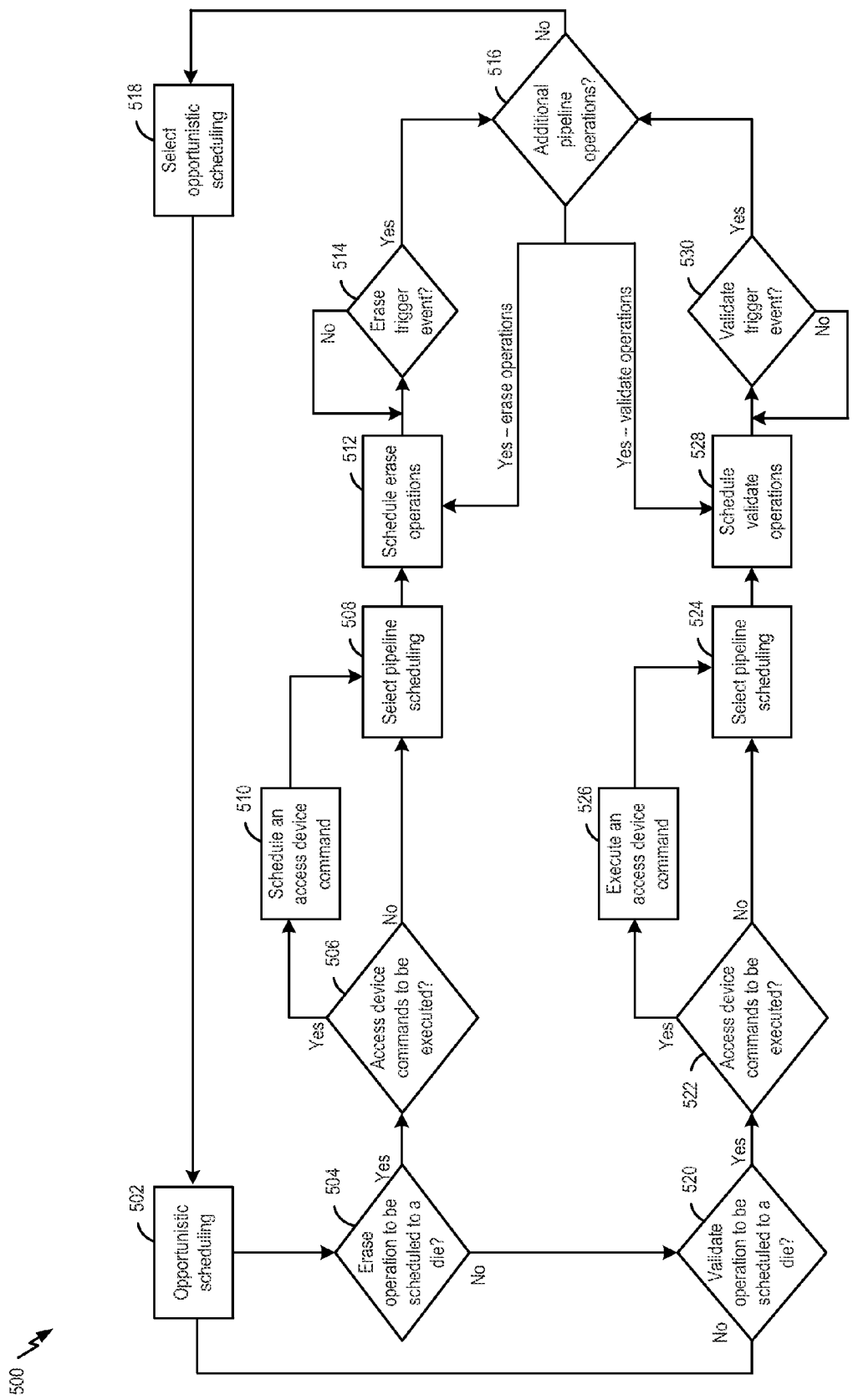
FIG. 5 is a flow diagram that illustrates another particular example of a method of operation of the data storage device of FIG. 1.

Referring to FIG. 5, a particular illustrative embodiment of a method is depicted and generally designated 500. The method 500 may be performed at the data storage device 102, such as by the scheduler 190, the controller 120, a processor or circuitry configured to execute the firmware 162 of FIG. 1, or a combination thereof, as illustrative, non-limiting examples.

The method 500 may include performing opportunistic scheduling, at 502. Performing the opportunistic scheduling may include or correspond to using the first scheduling scheme 166 of FIG. 1 to schedule at least one operation.

The method may include determining whether an erase operation is to be scheduled to a die, at 504. The die may be included in a memory of a data storage device, such as the memory 104 of the data storage device 102 of FIG. 1. For example, the memory may include a plurality of dies that includes the die. The die may be included in a group of dies associated with a meta plane (e.g., the meta plane 130) of the plurality of dies. In some implementations, the memory may include multiple meta planes, such as a first meta plane that includes the die and a second meta plane. If no erase operation is to be scheduled, the method 500 may proceed to 520. Alternatively, if there is an erase operation to be scheduled, the method 500 may advance to 506.

The method 500 may include determining whether access device commands are available to be executed, at 506. For example, one or more access device commands may be available and stored in the memory operation queue 195 of FIG. 1. The one or more access device commands may be received at the data storage device from an access device, such as the access device 150 of FIG. 1. If no access device commands are available, the method 500 may include selecting pipeline scheduling, at 508. The pipeline scheduling may include or correspond to the second scheduling scheme 168 of FIG. 1. Alternatively, if there are one or more access device commands to be executed, the method 500 may schedule (according to the opportunistic scheduling) the one or more access device commands, at 510, prior to advancing to 508.

After the pipeline scheduling is selected, at 508, the method 500 may include scheduling a set of erase operations, at 512. The set of erase operations may include or correspond to the one or more second memory operations 136 of FIG. 1.

The method 500 may include determining whether an erase trigger event occurred, at 514. Referring to FIG. 1, the erase trigger event may be detected by the trigger detector 180 of FIG. 1 and may include or correspond to one of the trigger events 181-184 of FIG. 1, such as the second trigger event 182 of FIG. 1. If the erase trigger event has not occurred, the method 500 may continue to monitor to detect and determine if the erase trigger event occurred, at 514. If the erase trigger event occurred, the method 500 may proceed to 516.

The method 500 may include determining whether a validate operation (e.g., a verify operation) is to be scheduled to a die, at 520. If no validate operation is to be scheduled, the method 500 may proceed to 502. Alternatively, if there is a validate operation to be scheduled, the method 500 may advance to 522.

The method 500 may include determining whether access device commands are available to be executed, at 522. If no access device commands are available, the method 500 may include selecting the pipeline scheduling, at 524. Alternatively, if there are one or more access device commands to be executed, the method 500 may schedule (according to the opportunistic scheduling) the one or more access device commands, at 526, prior to advancing to 524.

After the pipeline scheduling is selected, at 524, the method 500 may include scheduling a set of validate operations, at 528. The set of validate operations may include or correspond to the one or more second memory operations 136 of FIG. 1.

The method 500 may include determining whether a validate trigger event (e.g., a verify trigger event) occurred, at 530. Referring to FIG. 1, the validate trigger event may be detected by the trigger detector 180 of FIG. 1 and may include or correspond to one of the trigger events 181-184 of FIG. 1, such as the fourth trigger event 184 of FIG. 1. If the validate trigger event has not occurred, the method 500 may continue to monitor to detect and determine if a validate trigger event occurred, at 530. If the validate trigger event occurred, the method 500 may proceed to 516.

The method 500 may include determining whether additional pipeline operations are to be scheduled, at 516. If additional pipeline operations are to be scheduled, the method 500 may proceed to schedule the operations at 512 or 528. For example, if the additional pipeline operations are determined to be erase operations, the method 500 may proceed to 512. As another example, if the additional pipeline operations are determined to be validate operations, the method 500 may proceed to 528. Alternatively, if no pipeline operations are to be scheduled to the die, the method 500 may include selecting the opportunistic scheduling, at 518, prior to advancing to 502.

By dynamically switching between the opportunistic scheduling scheme and the pipelined scheduling scheme, memory utilization of the data storage device may be improved. Additionally, operations may be efficiently scheduled (and not delayed) by checking to determine if operations are available to be scheduled using a current scheduling scheme prior to dynamically switching to another scheduling scheme. By scheduling the available operations prior to switching, instances of repeatedly switching between the opportunistic scheduling scheme and the pipelined scheduling scheme during a short period of time may be reduced.

Figure 6:
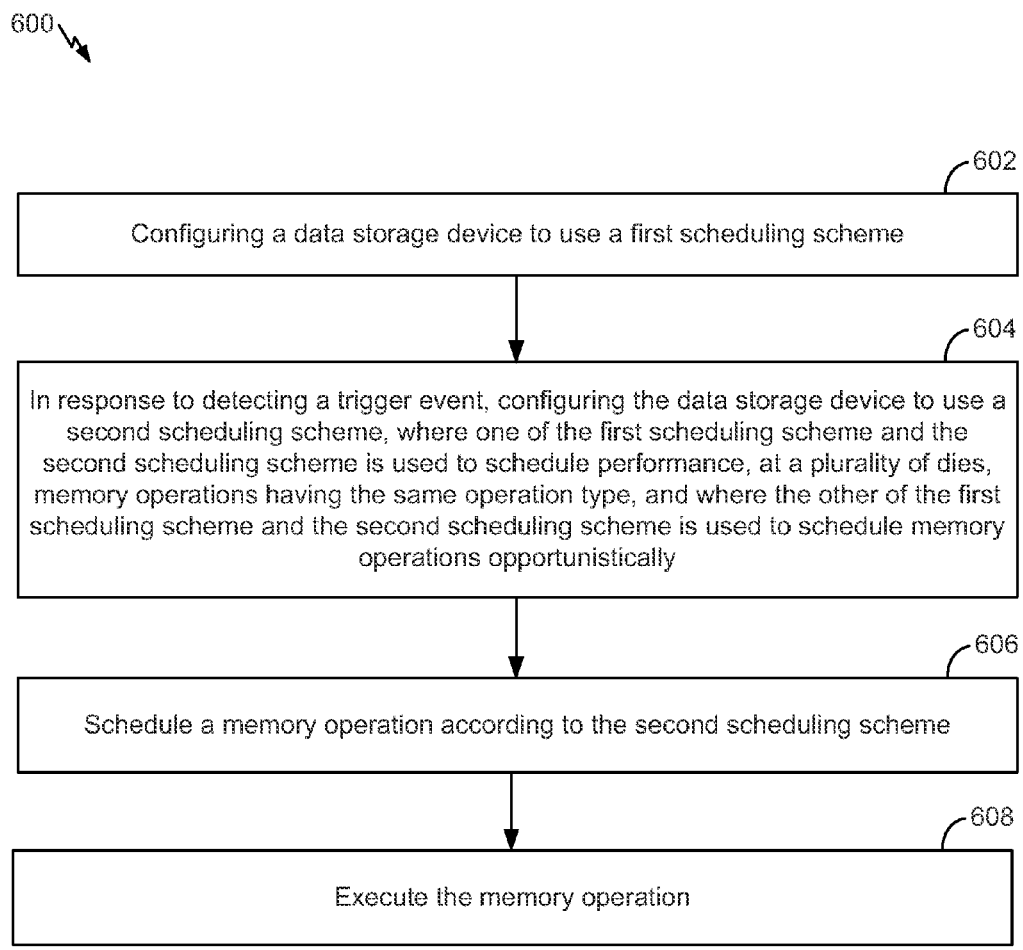
FIG. 6 is a flow diagram that illustrates another particular example of a method of operation of the data storage device of FIG. 1.

Referring to FIG. 6, a particular illustrative embodiment of a method is depicted and generally designated 600. The method 600 may be performed at the data storage device 102, such as by the scheduler 190, the controller 120, a processor or circuitry configured to execute the firmware 162 of FIG. 1, or a combination thereof, as illustrative, non-limiting examples.

The method 600 includes configuring the data storage device to use a first scheduling scheme, at 602. In some implementations, the first mode may be set (e.g., selected) by updating a mode register, such as the mode register 192 of FIG. 1, to a first value that corresponds to the first scheduling scheme 166. In some implementations, a second mode may be set (e.g., selected) by updating the mode register, such as the mode register 192 of FIG. 1, to a second value that corresponds to the first scheduling scheme 166. Referring to FIG. 1, the scheduler 190 (e.g., the scheme selector 191) may be configured to switch (e.g., change) a scheduling scheme in response to the mode change data 186. In some implementations, the first mode may be a default mode of the data storage device.

The method 600 includes, in response to detecting the trigger event, configuring the data storage device to use a second scheduling scheme, at 604. One of the first scheduling scheme and the second scheduling scheme is used to schedule performance, at the plurality of dies, of memory operations having the same operation type and the other of the first scheduling scheme and the second scheduling scheme is used to schedule memory operations opportunistically. Referring to FIG. 1, the trigger event may be include or correspond to one of the trigger events 181-184 detected by the trigger detector 180 of FIG. 1. For example, the trigger event may be associated with an erase operation or a validate operation. In some implementations, the trigger event may be associated with one or more operations that include or correspond to the one or more first memory operations 134, the one or more second memory operations 136, or the one or more third memory operations 138 of FIG. 1. In some implementations, the trigger event may be detected based on a count of write operations. In other implementations, the trigger event may be detected based on writing a last page in a block of a die (of a memory of the data storage device). In response to detecting the trigger event, the trigger detector 180 may be configured to send the mode change data 186 to the scheduler 190 of FIG. 1.

The method 600 includes scheduling a memory operation according to the second scheduling scheme, at 606. The method 600 may also include executing the memory operation, at 608. Referring to FIG. 1, the scheduler 190 may schedule an operation according to the second scheduling scheme 168. The operation may include or correspond to an erase operation, a validate operation, or a read operation, as illustrative, non-limiting examples. The memory operation may be executed at one of the dies 141-144 of FIG. 1.

In some implementations, the first scheduling scheme may include an opportunistic scheduling scheme, such as the first scheduling scheme 166 of FIG. 1, and the second scheduling scheme may include a pipelined scheduling scheme (e.g., a fixed scheduling scheme), such as the second scheduling scheme 168 of FIG. 1. The pipelined scheduling scheme may use a round robin approach to schedule operations at multiple dies of a memory of the data storage device, such as the dies 141-144 of the memory 104 of the data storage device 102 of FIG. 1. In a particular illustrative, non-limiting example, the opportunistic scheduling scheme may be a default operating scheme of the data storage device. In other implementations, the first scheduling scheme may include the pipelined scheduling scheme and the second scheduling scheme may include the opportunistic scheme. In a particular illustrative, non-limiting example, the pipelined scheduling scheme may be a default operating scheme of the data storage device.

In some implementations, the method 600 may include detecting a second trigger event while the data storage device is configured to operate in the second mode and, in response to detecting the second trigger event, configuring the data storage device to operate in the first mode. The second trigger event may be associated with the memory operation. For example, the second trigger event may correspond to scheduling the memory operation, initiating execution of the memory operation, or completing the execution of the memory operation, as illustrative, non-limiting examples. In some implementations, the method 600 may include scheduling a second memory operation according to the first scheduling scheme, and executing the second memory operation.

By detecting the trigger condition (e.g., a trigger event), the data storage device may dynamically switch from the first scheduling scheme to the second scheduling scheme. Accordingly, the data storage device may be able to select a particular scheduling scheme of multiple scheduling schemes based on one or more operating conditions of the data storage device. Dynamically switching between the multiple scheduling schemes may balance execution of different types of operations and may result in high memory utilization as compared to a data storage device that uses a single scheduling scheme.

Figure 7:
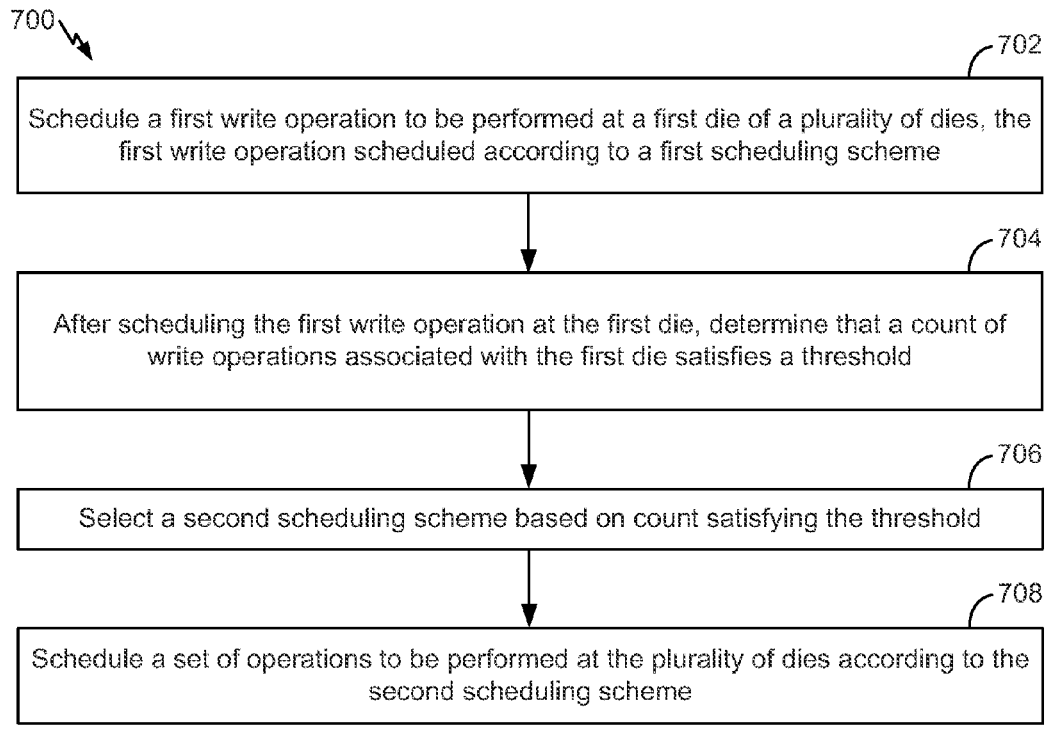
FIG. 7 is a flow diagram that illustrates another particular example of a method of operation of the data storage device of FIG. 1.

Referring to FIG. 7, a particular illustrative embodiment of a method is depicted and generally designated 700. The method 700 may be performed at the data storage device 102, such as by the scheduler 190, the controller 120, a processor or circuitry configured to execute the firmware 162 of FIG. 1, or a combination thereof, as illustrative, non-limiting examples.

The method 700 includes scheduling a first write operation to be performed at a first die of a plurality of dies, the first write operation scheduled according to a first scheduling scheme, at 702. For example, the first write operation may include or correspond to the one or more first memory operations 134 of FIG. 1. In some implementations, the first write operation may be a first page write operation. The plurality of dies may include or correspond to the multiple memory dies 103 of the data storage device 102 of FIG. 1. The first scheduling scheme may include or correspond to the first scheduling scheme 166 of FIG. 1. In some implementations, the first scheduling scheme may be an opportunistic scheduling scheme.

The method 700 also includes, after scheduling the first write operation at the first die, determining that a count of write operations performed at the first die satisfies a threshold, the count corresponds to one or more write operations, at 704. For example, the threshold may include or correspond to the threshold(s) 170 of FIG. 1. In some implementations, the count may correspond to one or more write operations performed at the first die after performance of a particular memory operation (performed at the first die). The particular memory operation may include or correspond to an erase operation or a validate operation, as illustrative, non-limiting examples. In some implementations, each of the write operations may be a page write operation.

The method 700 also includes selecting a second scheduling scheme based on the count satisfying the threshold, at 706. For example, the second scheduling scheme may include or correspond to the second scheduling scheme 168 of FIG. 1. In some implementations, the second scheduling scheme may be a pipelined scheduling scheme.

The method 700 further includes scheduling a set of operations to be performed at the plurality of dies according to the second scheduling scheme, at 708. For example, the second set of operations may include or correspond to the one or more second memory operations 136 of FIG. 1.

In some implementations, prior to scheduling the first write operation, the method 700 may include detecting sequential write operations to be performed at the memory based on addresses of multiple unscheduled operations. In response to detecting the sequential write operations, the first scheduling scheme (e.g., the opportunistic scheduling scheme) may be selected to be used to schedule operations to be performed at a memory including the plurality of dies. For example, the memory may include or correspond to the memory 104 of FIG. 1.

In some implementations, in response to performing the first write operation at the first die, a count of a counter corresponding to the first die may be updated. For example, the count may correspond to and/or indicate a number of write operations. To illustrate, updating the count may include incrementing the counter. If the counter is incremented in response to performing the first write operation, the threshold may be satisfied if the count is greater than or equal to the threshold. As another example, updating the count may include decrementing the counter. If the counter is decremented in response to performing the first write operation, the threshold may be satisfied if the count is less than or equal to the threshold.

In some implementations, the data storage device may include a plurality of counters. The plurality of counters may include or correspond to the one or more counters 172 of FIG. 1. In some implementations, each counter of the plurality of counters may correspond to a different die of the plurality of dies and may be configured to count write operations performed at a corresponding die. The method 700 may include setting each of the plurality of counters to an initial value in response to determining that a particular count of write operations indicated by a particular counter of the plurality of counters satisfies a threshold.

In some implementations, if the particular memory operation includes an erase operation, the set of operations may include a set of erase operations. After scheduling the set of erase operations, the method 700 may include detecting a trigger event corresponding to performance of the set of erase operations at the plurality of dies. For example, the trigger event may correspond to completion of a particular erase operation of the set of erase operations that has a longest scheduled execution period. As another example, the trigger event may correspond to completion of an initial scheduled erase operation of the set of erase operations. The method 700 may also include changing from the second scheduling scheme to the first scheduling scheme based on detecting the trigger event (corresponding to performance of the set of erase operations).

In other implementations, if the particular memory operation includes a validate operation (e.g., a verify operation), the set of operations comprises a set of validate operations (e.g., a set of verify operations). After scheduling the set of validate operations, the method 700 may include detecting a trigger event corresponding to performance of the set of validate operations at the plurality of dies. For example, the trigger event may correspond to initiation of execution of a final validate operation of the set of validate operations. As another example, the trigger event may correspond to completion of execution of a final validate operation of the set of validate operations. The method 700 may also include changing from the second scheduling scheme to the first scheduling scheme based on detecting the trigger event (corresponding to performance of the set of validate operations).

In some implementations, after determining the threshold is satisfied and prior to applying the second scheduling scheme, the method 700 may include identifying one or more unscheduled operations and scheduling at least one operation of the one or more unscheduled operations for execution prior to scheduling (according to the second scheduling scheme) the set of operations. The one or more unscheduled operations may be included in (e.g., stored at) a queue maintained at the data storage device. For example, the queue may include or correspond to the memory operation queue 195 of FIG. 1. Alternatively, the one or more unscheduled operations may be included in (e.g., stored at) a queue maintained at an access device coupled to data storage device, such as a queue maintained by the access device 150 that is coupled to the data storage device 102 of FIG. 1.

In some implementations, after scheduling the set of operations, the method 700 may include detecting a trigger event corresponding to performance of the set of operations at the plurality of dies. Prior to changing from the second scheduling scheme to the first scheduling scheme responsive to detecting the trigger event, the method 700 may include determining whether a second set of operations to be performed at the memory is unscheduled. The second set of operations may be scheduled according to the second scheduling scheme (prior to changing from the second scheduling scheme to the first scheduling scheme responsive to detecting the trigger event) in response to determining that the second set of operations is unscheduled. To illustrate, a queue status includes data that indicates whether the access device includes operations to be performed at the memory of the data storage device (102) may be received from an access device (e.g., the access device 150) coupled to the data storage device. The second set of operations may be determined to be unscheduled is based on the queue status and may be scheduled according to the second scheduling scheme.

By selectively applying different scheduling schemes based on whether the threshold is satisfied, a memory utilization of the data storage device may be improved. For example, selectively applying different scheduling schemes may balance execution of read/write operations received from the access device along with management operations to result in high memory utilization as compared to a data storage device that uses a single scheduling scheme.

Figure 8:
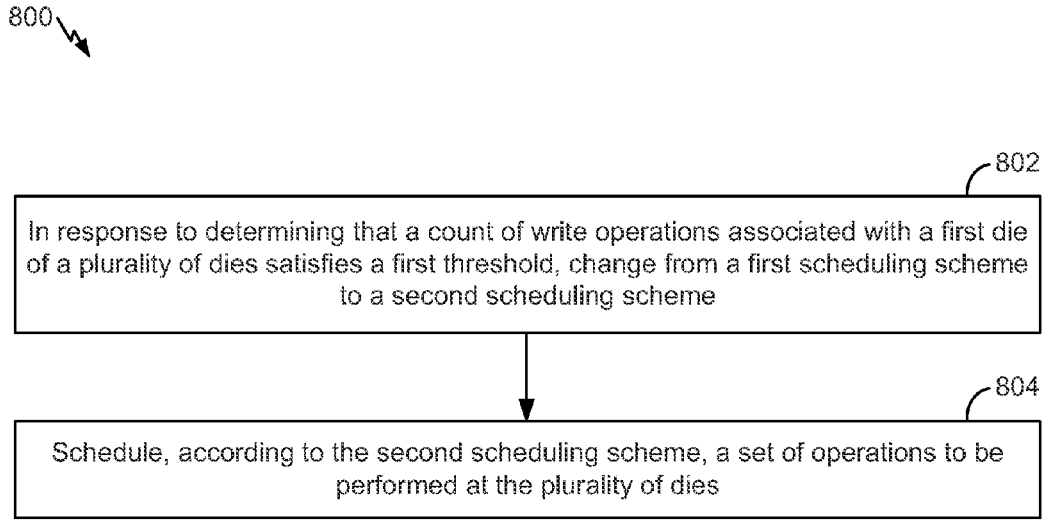
FIG. 8 is a flow diagram that illustrates another particular example of a method of operation of the data storage device of FIG. 1.

Referring to FIG. 8, a particular illustrative embodiment of a method is depicted and generally designated 800. The method 800 may be performed at the data storage device 102, such as by the scheduler 190, the controller 120, a processor or circuitry configured to execute the firmware 162 of FIG. 1, or a combination thereof, as illustrative, non-limiting examples.

The method 800 includes, in response to determining that a count of write operations associated with a first die of the plurality of dies satisfies a first threshold, changing from a first scheduling scheme to a second scheduling scheme, at 802. The plurality of dies may include or corresponding to the multiple memory dies 103 of the data storage device 102 of FIG. 1. In some implementations, the count may correspond to write operations performed at the first die after performance of a particular memory operation (performed at the first die). In some implementations, each of the write operations may be a page write operation. The first scheduling scheme and the second scheduling scheme may include or correspond to the first scheduling scheme 166 and the second scheduling scheme 168, respectively, of FIG. 1. In some implementations, the first scheduling scheme may be an opportunistic scheduling scheme and the second scheduling scheme may be a pipelined scheduling scheme. In other implementations, the first scheduling scheme may be the pipelined scheduling scheme and the second scheduling scheme may be the opportunistic scheduling scheme.

The method 800 also includes scheduling, according to the second scheduling scheme, a set of operations to be performed at the plurality of dies, at 804. For example, the second set of operations may include or correspond to the one or more second memory operations 136 of FIG. 1. If the particular memory operation is the erase operation, each operation of the set of operations may be an erase operation. Alternatively, if the particular memory operation is the validate operation, each operation of the set of operations may be a validate operation.

In some implementations, the method 800 may include, prior to determining that the count satisfies the first threshold, updating a counter, based on a first write operation scheduled to be performed at the first die, to indicate the count. For example, the first write operation may include or correspond to the one or more first memory operations 134 of FIG. 1. In some implementations, the first write operation may be a first page write operation. The counter may be updated in response to scheduling the first write operation, initiating execution of the first write operation, or completing the execution of the first write operation. The particular memory operation may include or correspond to an erase operation or a validate operation, as illustrative, non-limiting examples.

In some implementations, the method 800 may include updating a second count based on the first write operation. The second count may be associated with write operations scheduled to be performed at the first die after performance of a second particular memory operation. To illustrate, referring to FIG. 1, the count may correspond to the first counter 174 (indicating a count of write operations after a particular erase operation) of FIG. 1 and the second count may correspond to the second counter 176 (indicating a count of write operations after a particular validate operation) of FIG. 1. Alternatively, the count may correspond the second counter 176 and the second count may correspond to the first counter 174. In response to the second count satisfying a second threshold, the method 800 may include changing from the first scheduling scheme to the second scheduling scheme; and applying the second scheduling scheme to schedule a second set of operations to be performed at the plurality of dies. For example, if the second count corresponds to (and/or indicates) a count of write operations after a particular erase operation, the second set of operations may include a set of erase operations. As another example, if the second count corresponds to (and/or indicates) a count of write operations after a particular validate operation, the second set of operations may include a set of validate operations.

As an illustrative, non-limiting example, the particular memory operation may include an erase operation and the second particular memory operation may include a validate operation. In response to the second count satisfies a second threshold, the method 800 may include changing from the first scheduling scheme to the second scheduling scheme and applying the second scheduling scheme to schedule a second set of operations to be performed at the plurality of dies. In some implementations, the first threshold may correspond to a first threshold value and the second threshold may correspond to a second threshold value. The first threshold value may be greater than or equal to the second threshold value. Alternatively, the first threshold value may be less than the second threshold value.

In some implementations, the set of memory operations may be performed at a memory that includes the plurality of dies. For example, the memory may include or correspond to the memory 104 of FIG. 1. In response to performing the set of operations, the method 800 may include setting the counter to an initial value. To illustrate, the initial value may be zero (0), as an illustrative, non-limiting example.

In some implementations, a trigger event may be detected that corresponds to execution of at least one operation of the set of operations at the plurality of dies. The method 800 may include changing from the second scheduling scheme to the first scheduling scheme based on detecting the trigger event.

By tracking a count of write operations performed at a particular die, the data storage device may identify one or more trigger conditions (e.g., one or more trigger events). In response to a particular trigger event, the data storage device may dynamically switch (and selectively apply) a particular scheduling scheme of multiple scheduling schemes. Dynamically switching to (e.g., dynamically selecting) the particular scheduling scheme may result in high memory utilization as compared to a data storage device that uses a single scheduling scheme.

The method 400 of FIG. 4, the method 500 of FIG. 5, the method 600 of FIG. 6, the method 700 of FIG. 7, and/or the method 800 of FIG. 8 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, method 400 of FIG. 4, the method 500 of FIG. 5, the method 600 of FIG. 6, the method 700 of FIG. 7, and/or the method 800 of FIG. 8 can be initiated or controlled by one or more processors, such as one or more processors included in or coupled to a controller or a memory of the data storage device 102 and/or the access device 150 of FIG. 1. A controller configured to perform the method 400 of FIG. 4, the method 500 of FIG. 5, the method 600 of FIG. 6, the method 700 of FIG. 7, and/or the method 800 of FIG. 8 may be able to select between a first scheduling scheme and a second scheduling scheme to schedule operations for a storage device. As an example, one or more of the methods of FIGS. 4-8, individually or in combination, may be performed by the controller 120 of FIG. 1. To illustrate, a portion of one of the methods FIGS. 4-8 may be combined with a second portion of one of the methods of FIGS. 4-8. Additionally, one or more operations described with reference to the FIGS. 4-8 may be optional, may be performed at least partially concurrently, and/or may be performed in a different order than shown or described.

In an illustrative example, a processor may be programmed to use a first scheduling scheme and a second scheduling scheme to schedule operations for a storage device. For example, the processor may execute instructions to schedule, according to a first scheduling scheme, a first write operation to be performed at a first die of a plurality of dies. The processor may further execute instructions to, after performing the first write operation at the first die, determine that a count of write operations performed at the first die satisfies a threshold. The write operations may be performed at the first die after performance of a particular memory operation, such as an erase operation or a validate operation, as illustrative, non-limiting examples. The processor may further execute instructions to select a second scheduling scheme based on the threshold being satisfied and to schedule a set of operations to be performed at the plurality of dies according to the second scheduling scheme.

In another illustrative example, a processor may be programmed to change between different scheduling schemes to schedule operations for a data storage device. For example, the processor may execute instructions to update the count in response to a first write operation performed at a first die of a plurality of dies. The count may be associated with a count of write operations performed at the first die after performance of a particular memory operation, such as an erase operation or a validate operation, as illustrative, non-limiting examples. The processor may further execute instructions to, in response to the count satisfying a threshold, change from a first scheduling scheme to a second scheduling scheme. The processor may further execute instructions to apply the second scheduling scheme to schedule a set of operations to be performed at the plurality of dies.

Although various components of the data storage device 102 and/or the access device 150 of FIG. 1 are depicted herein as block components and described in general terms, such components may include one or more microprocessors, state machines, or other circuits configured to enable the various components to perform operations described herein. One or more aspects of the various components may be implemented using a microprocessor or microcontroller programmed to perform operations described herein, such as one or more operations of the method 400 of FIG. 4, the method 500 of FIG. 5, the method 600 of FIG. 6, the method 700 of FIG. 7 and/or the method 800 of FIG. 8. In a particular implementation, each of the controller 120, the memory 104, the second memory 160, and/or the access device 150 of FIG. 1 includes a processor executing instructions that are stored at a memory, such as a non-volatile memory of the data storage device 102 or the access device 150 of FIG. 1. Alternatively or additionally, executable instructions that are executed by the processor may be stored at a separate memory location that is not part of the non-volatile memory, such as at a read-only memory (ROM) of the data storage device 102 or the access device 150 of FIG. 1.

In conjunction with one or more of the described aspects of FIGS. 1-8, an apparatus includes means for storing data at a memory. For example, the means for storing data may include or correspond to the memory 104, the memory dies 103 of FIG. 1, one or more other structures, devices, circuits, or any combination thereof. The apparatus may further includes means for controlling the means for storing data. For example, the means for controlling may include or correspond to the controller 120, the trigger detector 180, the scheduler 190, the scheme selector 191, the mode register 192 of FIG. 1, one or more other structures, devices, circuits, modules, or instructions for controlling the means for storing data, or any combination thereof.

With reference to FIG. 1, the data storage device 102 may be attached to or embedded within one or more access devices, such as within a housing of a communication device (e.g., the access device 150). For example, the data storage device 102 may be integrated within an apparatus, such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory. However, in other embodiments, the data storage device 102 may be implemented in a portable device configured to be selectively coupled to one or more external access devices. In still other embodiments, the data storage device 102 may be a component (e.g., a solid-state drive (SSD)) of a network accessible data storage system, such as an enterprise data system, a network-attached storage system, a cloud data storage system, etc.

To further illustrate, the data storage device 102 may be configured to be coupled to the access device 150 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. In yet another particular embodiment, the data storage device 102 is coupled to the access device 150 indirectly, e.g., via a network. For example, the data storage device 102 may be a network-attached storage (NAS) device or a component (e.g., a solid-state drive (SSD) device) of a data center storage system, an enterprise storage system, or a storage area network.

The memory 104 and/or the second memory 160 of FIG. 1 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory 104 and/or the second memory 160 may include another type of memory. The memory 104 and/or the second memory 160 of FIG. 1 may include a semiconductor memory device.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   at a data storage device including a memory, the memory including a plurality of dies, performing:
   configuring the data storage device to use at least a first scheduling scheme, a second scheduling scheme and a third scheduling scheme and wherein at least two of the first, second and third schemes is a pipeline scheduling scheme and an opportunistic scheduling scheme;
   in response to detecting one of a erase operation and a validate operation as a trigger event identified by a trigger detector in a controller, configuring the data storage device to switch from using the first scheduling scheme to the second scheduling scheme, wherein the first, second and third scheduling schemes are in the controller;
   scheduling the memory operation according to the second scheduling scheme;
   executing the memory operation;
   detecting a second trigger event with the trigger detector in the controller; and
   switching from the second scheduling scheme to the third scheduling scheme and wherein two of the first scheduling scheme, the second scheduling scheme and the third scheduling scheme are different and wherein the first, second and third scheduling schemes are independent from a scheduler in the controller.

2. The method of claim 1, further comprising detecting one of the erase operation and a validate operation based on writing a last page in a block of a die of the plurality of dies.

3. The method of claim 1, further comprising:
   in response to detecting the second trigger event, configuring the data storage device to use the third scheduling scheme.

4. The method of claim 3, wherein the second trigger event is associated with the memory operation.

5. The method of claim 4, wherein the second trigger event corresponds to scheduling the memory operation, initiating execution of the memory operation, or completing the execution of the memory operation.

6. The method of claim 3, further comprising, in response to detecting the second trigger event:
   scheduling a second memory operation according to the pipeline scheduling scheme; and
   executing the second memory operation.

7. A method comprising:
   at a data storage device including a memory, the memory including a plurality of dies, performing:
   detecting a trigger event identified by a trigger detector in a controller based on a count of write operations;
   configuring the data storage device to use a pipeline scheduling scheme;
   in response to detecting one of a erase operation and a validate operation, configuring the data storage device to use an opportunistic scheduling scheme using next available die arbitration, wherein the pipeline scheduling scheme is used to schedule performance, at the plurality of dies, of memory operations, and wherein opportunistic scheduling scheme is used to schedule a memory operation opportunistically;
   scheduling the memory operation according to the opportunistic scheduling scheme; and
   executing the memory operation and wherein the pipeline scheduling scheme and the opportunistic scheduling scheme are independent from a scheduler in the controller.

8. A data storage device comprising:
   a memory including a plurality of dies; and
   a controller coupled to the memory, wherein the controller is configured to select a pipeline scheduling scheme and, in response to detecting a trigger event identified by a trigger detector in the controller, to change from the pipeline scheduling scheme to a opportunistic scheduling scheme, wherein one of a first scheduling scheme and a second scheduling scheme and a third scheme is used to schedule performance, at the plurality of dies, of memory operations and an opposite of the first scheduling scheme and the second scheduling scheme is used to schedule a memory operation opportunistically, wherein the controller is further configured to schedule the memory operation according to the second scheduling scheme and to initiate execution of the memory operation and wherein the first, second and third scheduling schemes are independent from a scheduler in the controller.

9. The data storage device of claim 8, wherein the pipeline scheduling scheme is a default scheduling scheme of the data storage device.

10. The data storage device of claim 8, wherein the opportunistic scheduling scheme is a default scheduling scheme of the data storage device.

* * * * *